United States Patent [19]

Parkyn, Jr. et al.

[11] Patent Number: 5,806,955
[45] Date of Patent: Sep. 15, 1998

[54] TIR LENS FOR WAVEGUIDE INJECTION

[75] Inventors: William A. Parkyn, Jr., Costa Mesa; David G. Pelka, Los Angeles, both of Calif.

[73] Assignee: TIR Technologies, Inc., Carson City, Nev.

[21] Appl. No.: 472,288

[22] Filed: Jun. 7, 1995

Related U.S. Application Data

[63] Continuation-in-part of Ser. No. 415,274, Apr. 7, 1995, Pat. No. 5,577,492, which is a continuation-in-part of Ser. No. 869,003, Apr. 16, 1992, Pat. No. 5,404,869.

[51] Int. Cl.[6] .................................................. F21V 7/04
[52] U.S. Cl. ............................. 362/31; 362/23; 362/339; 362/27; 362/800
[58] Field of Search ............................ 362/31, 23, 32, 362/61, 83.3, 353, 339, 800, 27, 26

[56] References Cited

U.S. PATENT DOCUMENTS

| | | |
|---|---|---|
| 1,421,506 | 7/1922 | Limpert . |
| 3,915,148 | 10/1975 | Fletcher et al. . |
| 3,941,993 | 3/1976 | Hubert . |
| 3,970,070 | 7/1976 | Meyer et al. . |
| 4,002,031 | 1/1977 | Bell . |
| 4,022,186 | 5/1977 | Northrup, Jr. . |
| 4,074,704 | 2/1978 | Gellert . |
| 4,103,673 | 8/1978 | Woodworth et al. . |
| 4,108,540 | 8/1978 | Anderson et al. . |
| 4,116,223 | 9/1978 | Vasilantone . |
| 4,124,017 | 11/1978 | Paull . |
| 4,136,670 | 1/1979 | Davis . |
| 4,171,695 | 10/1979 | Sletten . |
| 4,194,949 | 3/1980 | Stark . |
| 4,337,759 | 7/1982 | Popovich et al. . |
| 4,726,642 | 2/1988 | Mori ............................................ 362/31 |
| 4,755,921 | 7/1988 | Nelson . |
| 4,767,172 | 8/1988 | Nichols et al. .......................... 362/800 |
| 5,070,431 | 12/1991 | Kitazawa et al. ........................ 362/31 |
| 5,150,966 | 9/1992 | Nelson . |
| 5,375,043 | 12/1994 | Tokunaga ................................... 362/31 |
| 5,404,869 | 4/1995 | Parkyn, Jr. et al. . |

FOREIGN PATENT DOCUMENTS

| | | |
|---|---|---|
| 1325086 | 8/1973 | United Kingdom . |
| 1325087 | 8/1973 | United Kingdom . |
| 1546791 | 5/1979 | United Kingdom . |
| 1546792 | 5/1979 | United Kingdom . |
| 1546793 | 5/1979 | United Kingdom . |
| 1557472 | 12/1979 | United Kingdom . |
| 1561129 | 2/1980 | United Kingdom . |
| 2239939 | 1/1993 | United Kingdom . |
| 2239940 | 12/1993 | United Kingdom . |

*Primary Examiner*—Larry Jones
*Attorney, Agent, or Firm*—William W. Haefliger

[57] ABSTRACT

A radiant energy redirecting system comprising a radiant energy transmitting body structure; the structure comprising multiple elements, each of which acts as a radiant energy redirecting module, having on its cross-sectional perimeter an entry face to receive incidence of the energy into the interior of the perimeter, an exit face to pass the energy to the exterior of the perimeter in a direction towards the reverse side of the body from the side of the incidence, and a Totally Internally Reflecting face angled relative to the entry and exit faces to redirect towards the exit face the radiant energy incident from the entry face; the body structure generally redirecting incident radiant energy towards a predetermined target zone situated apart from and on the reverse side of the body relative to the side of the incidence; and lens structure associated with at least one of the faces for redirecting radiant energy passing between the entry and exit faces via the Totally Internally Reflecting face.

20 Claims, 24 Drawing Sheets

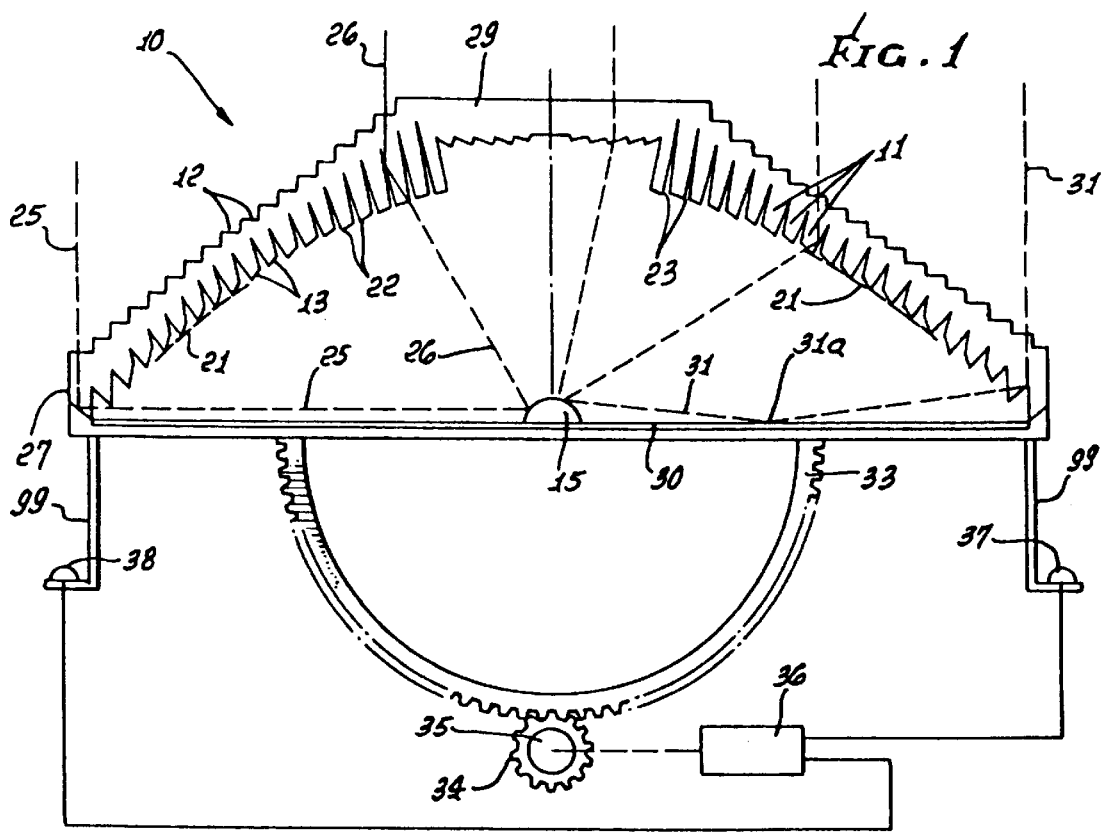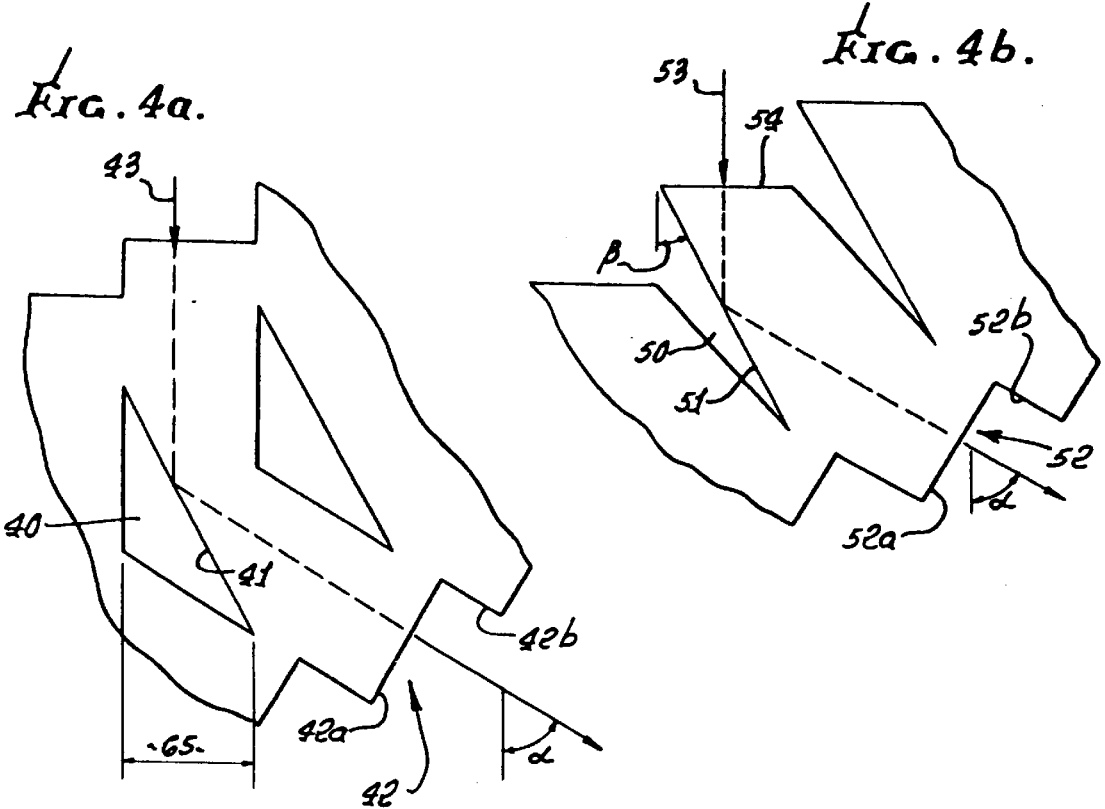

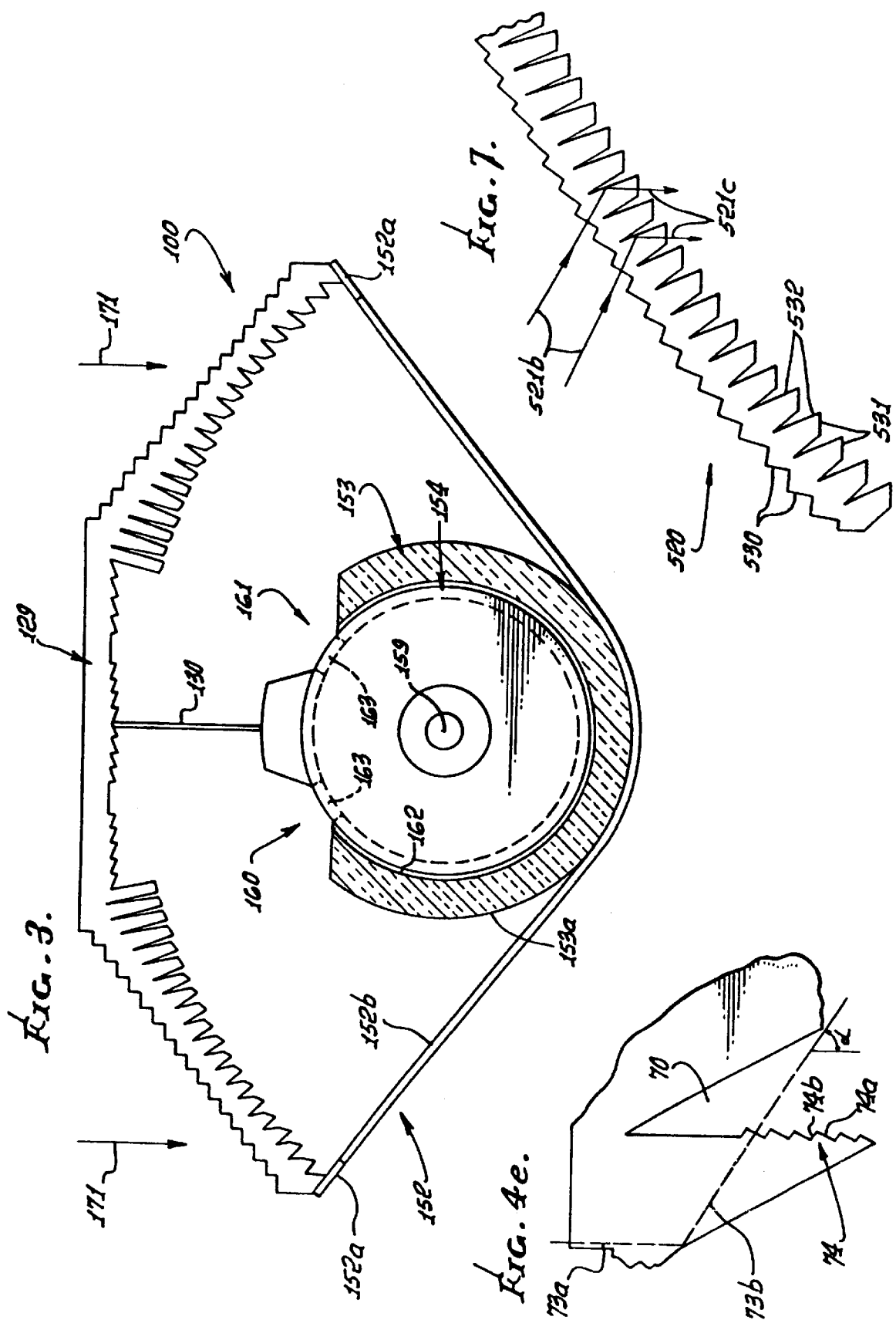

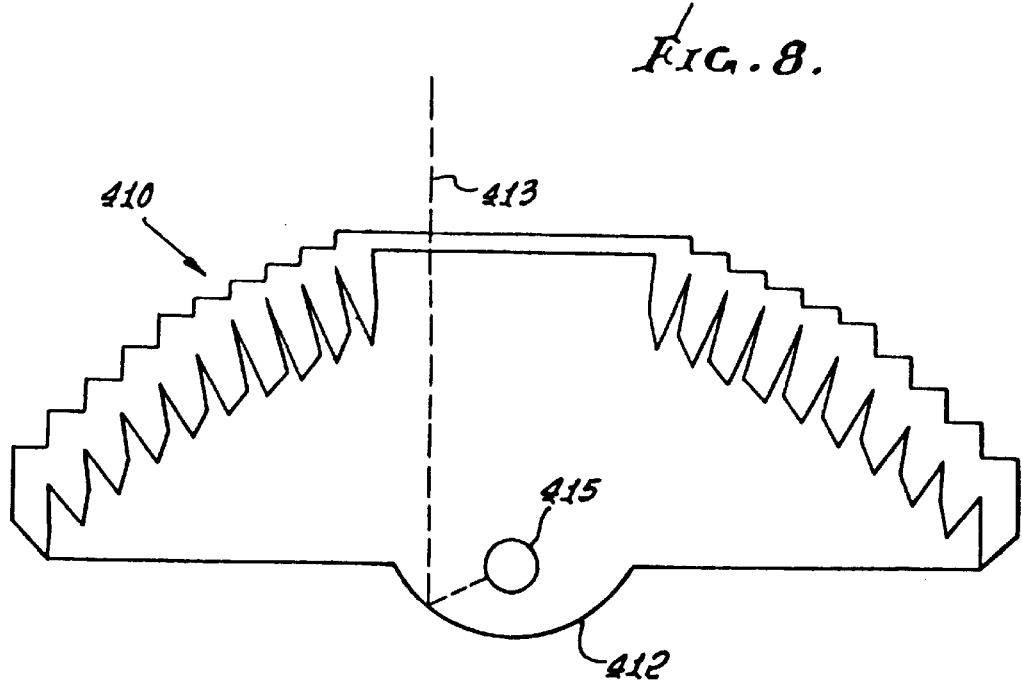
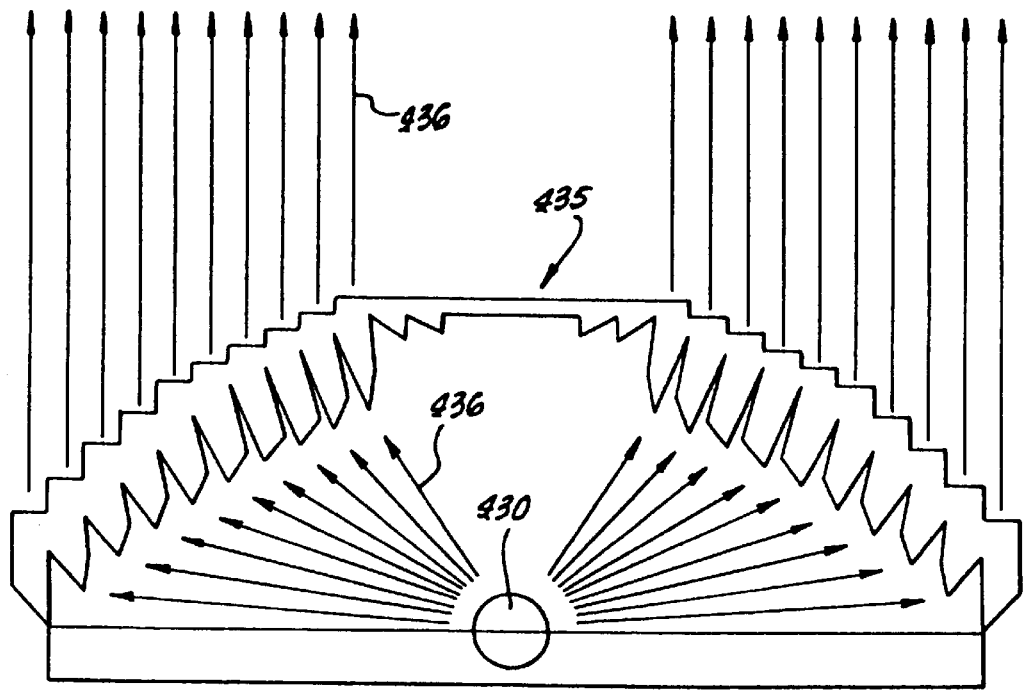

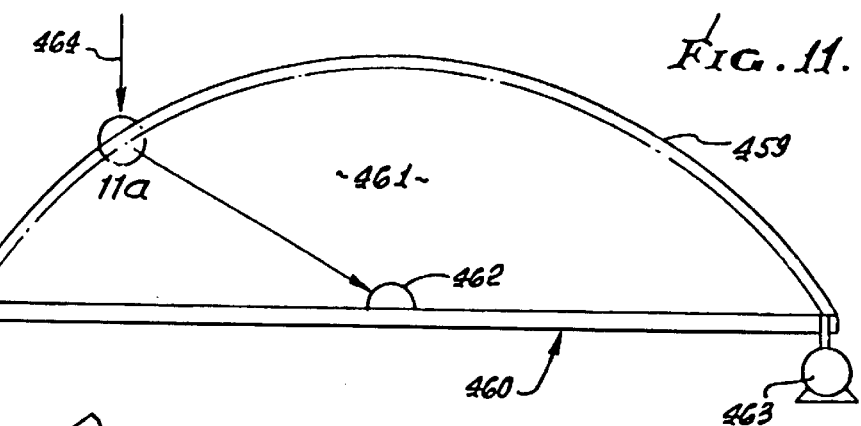
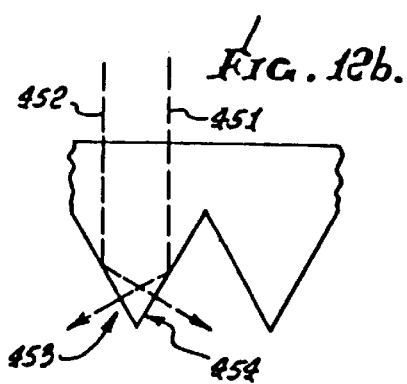
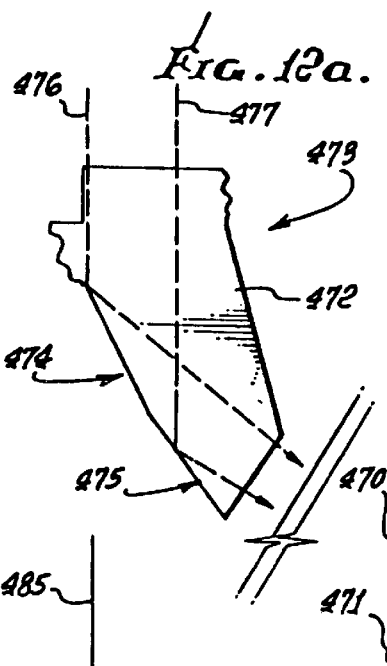
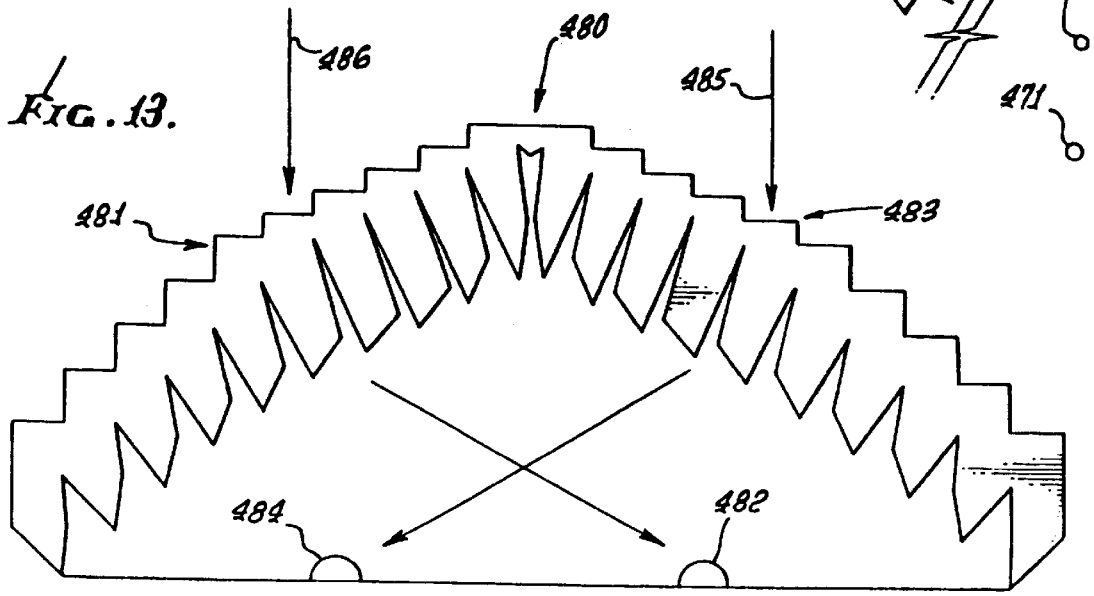

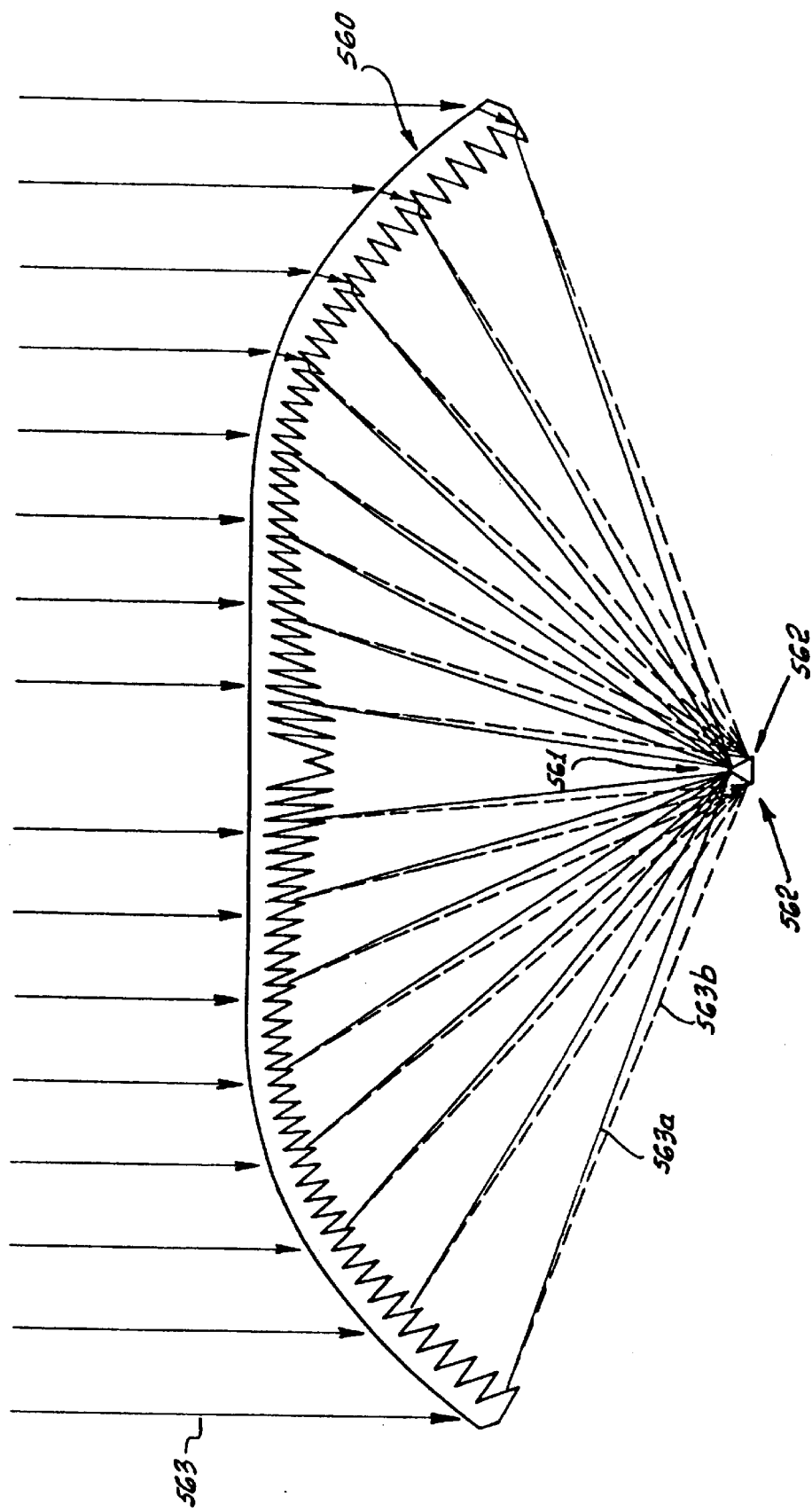

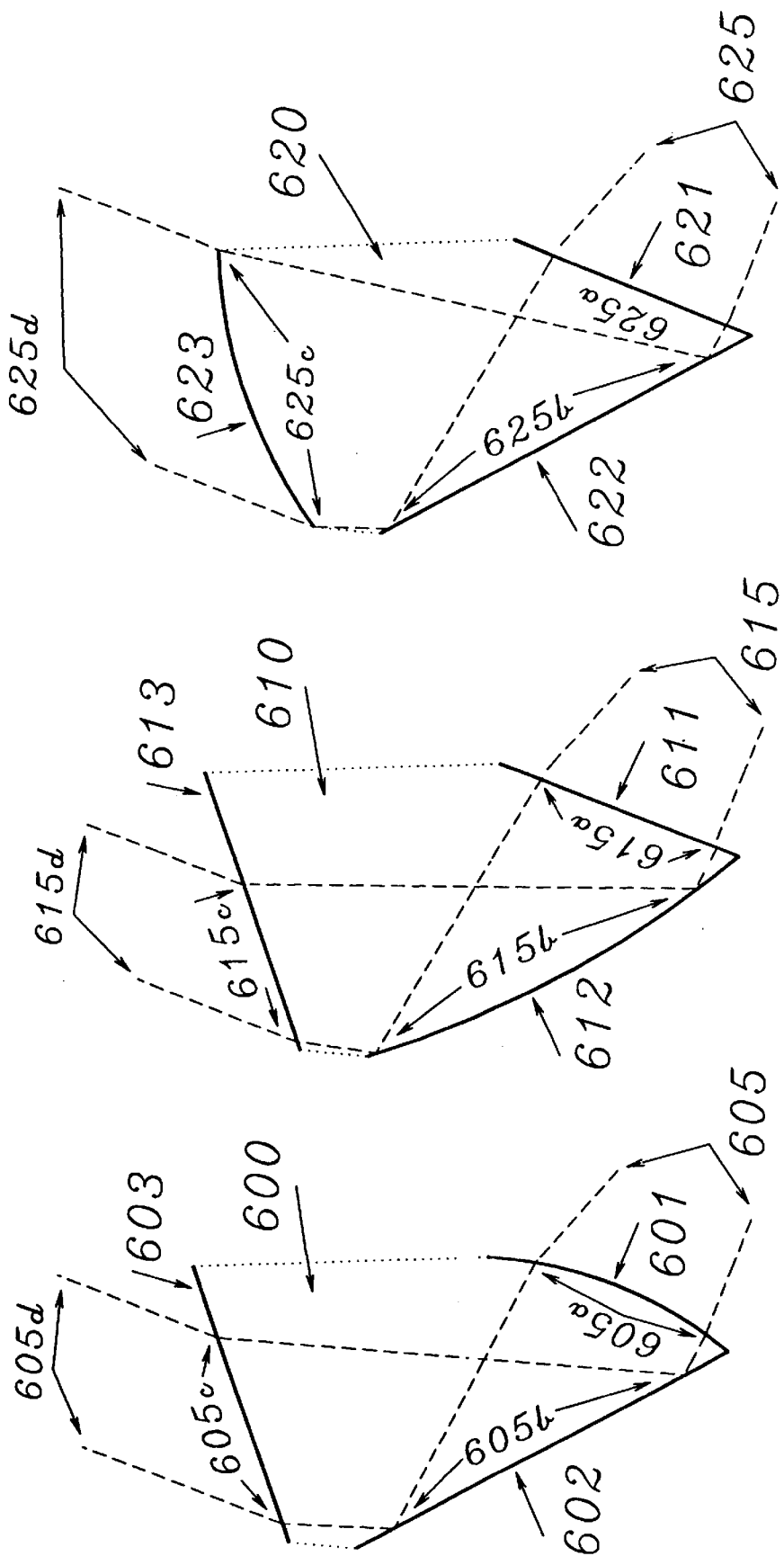

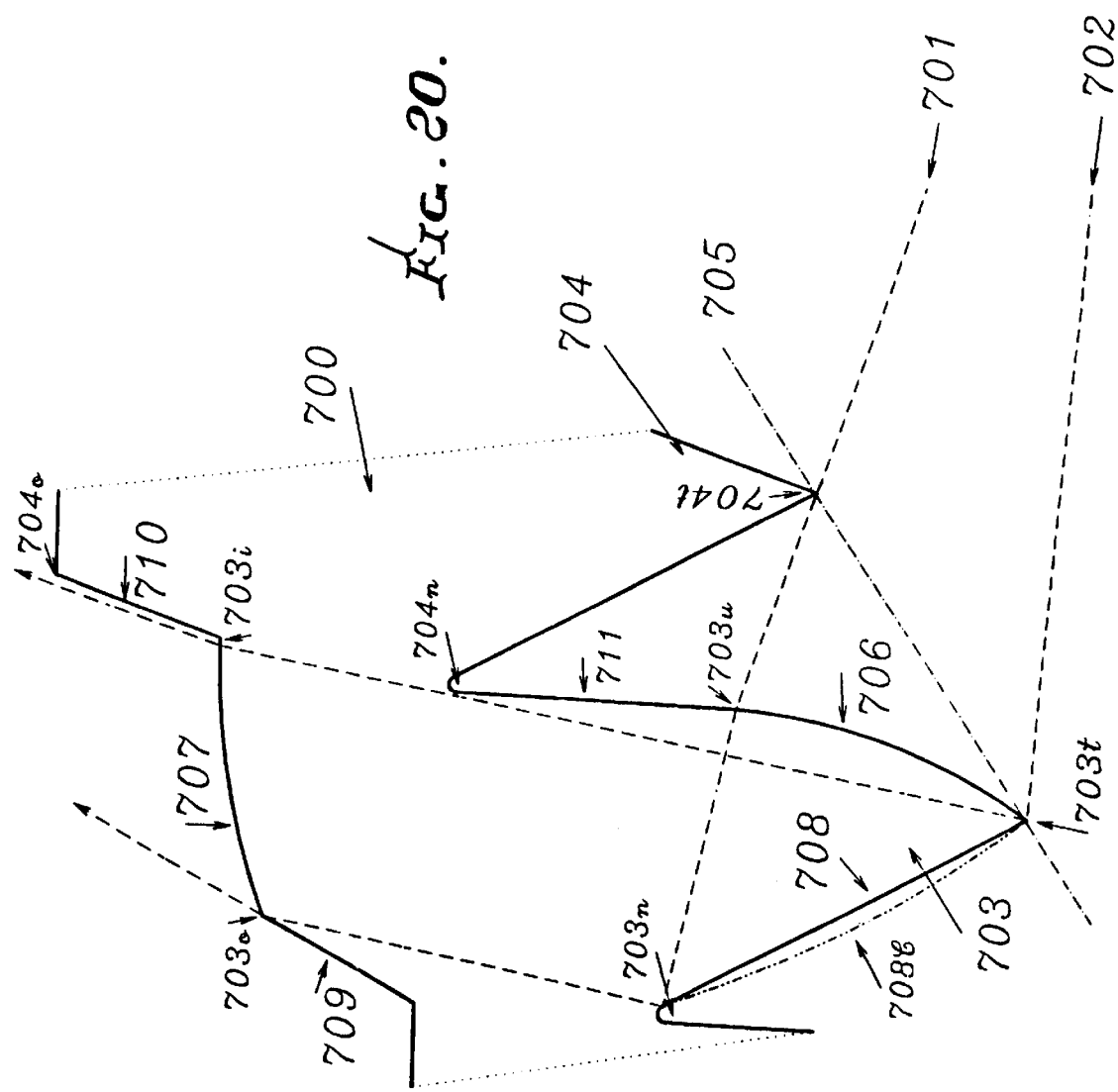

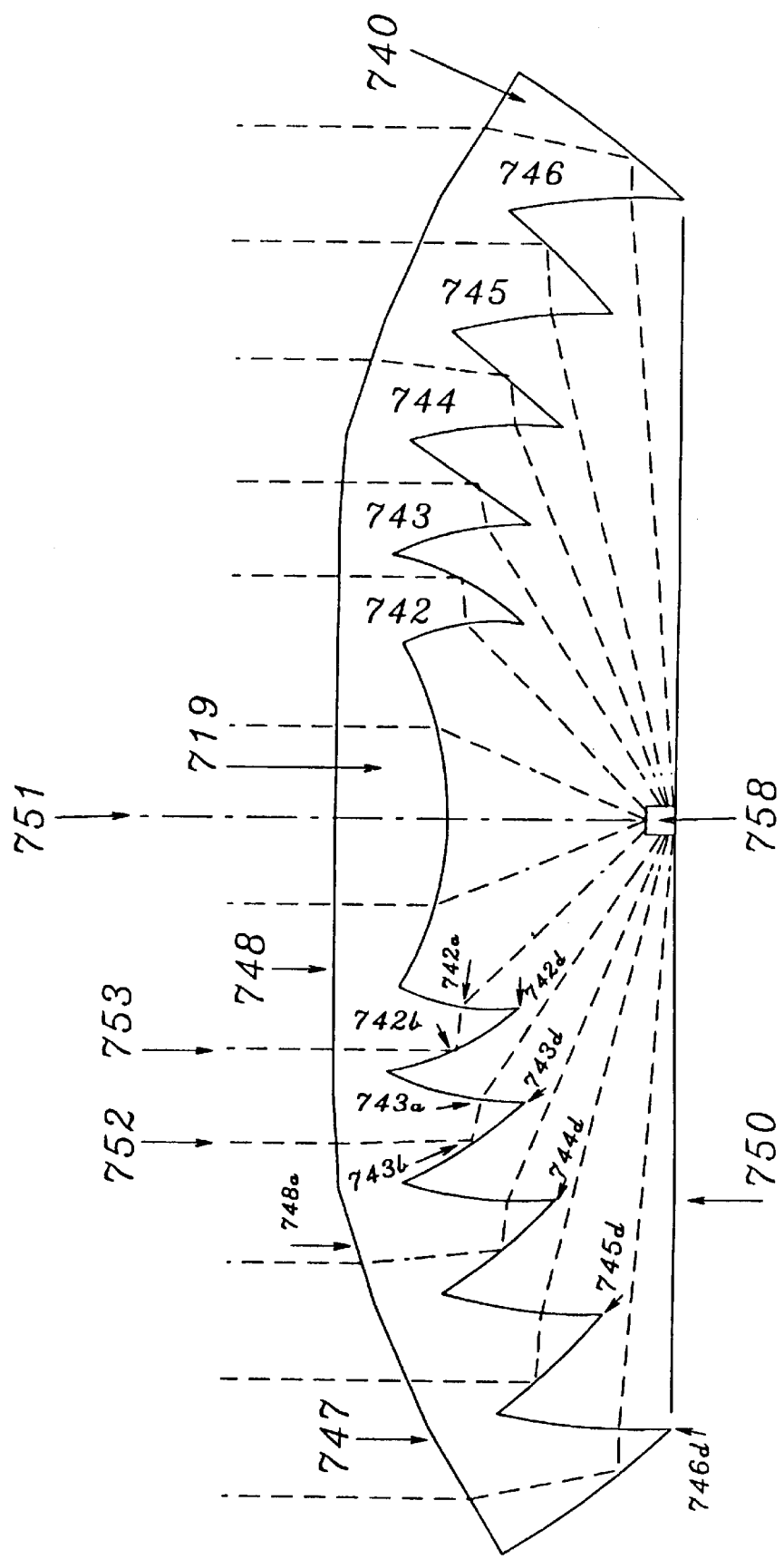

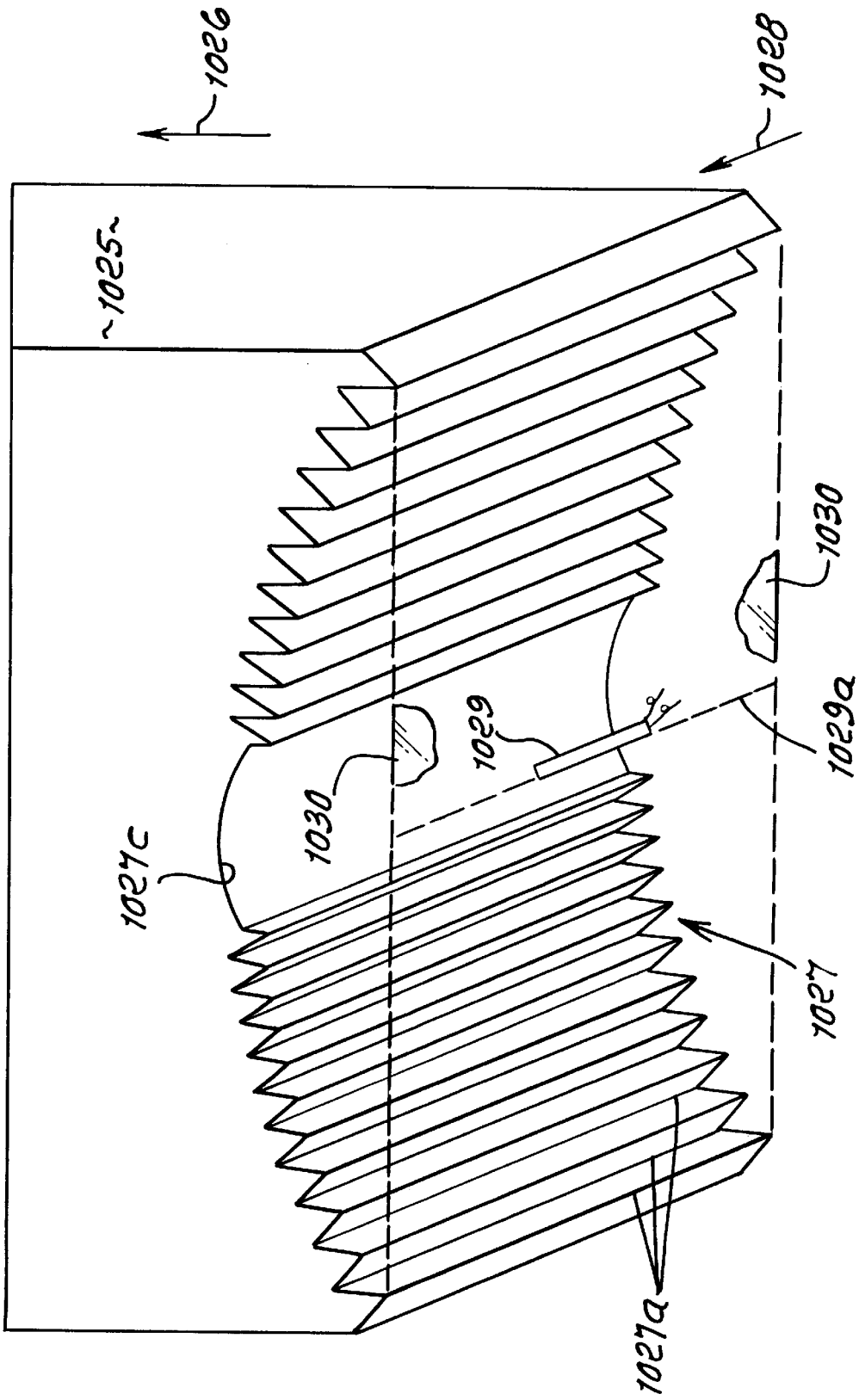

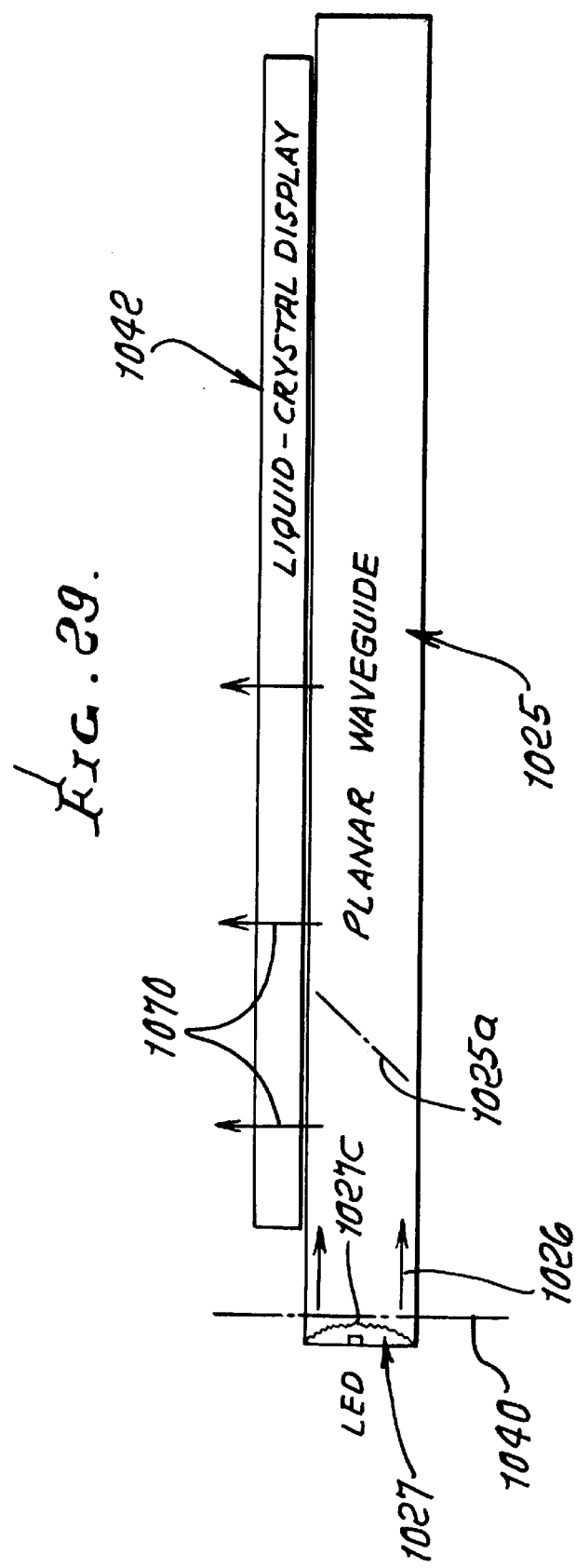

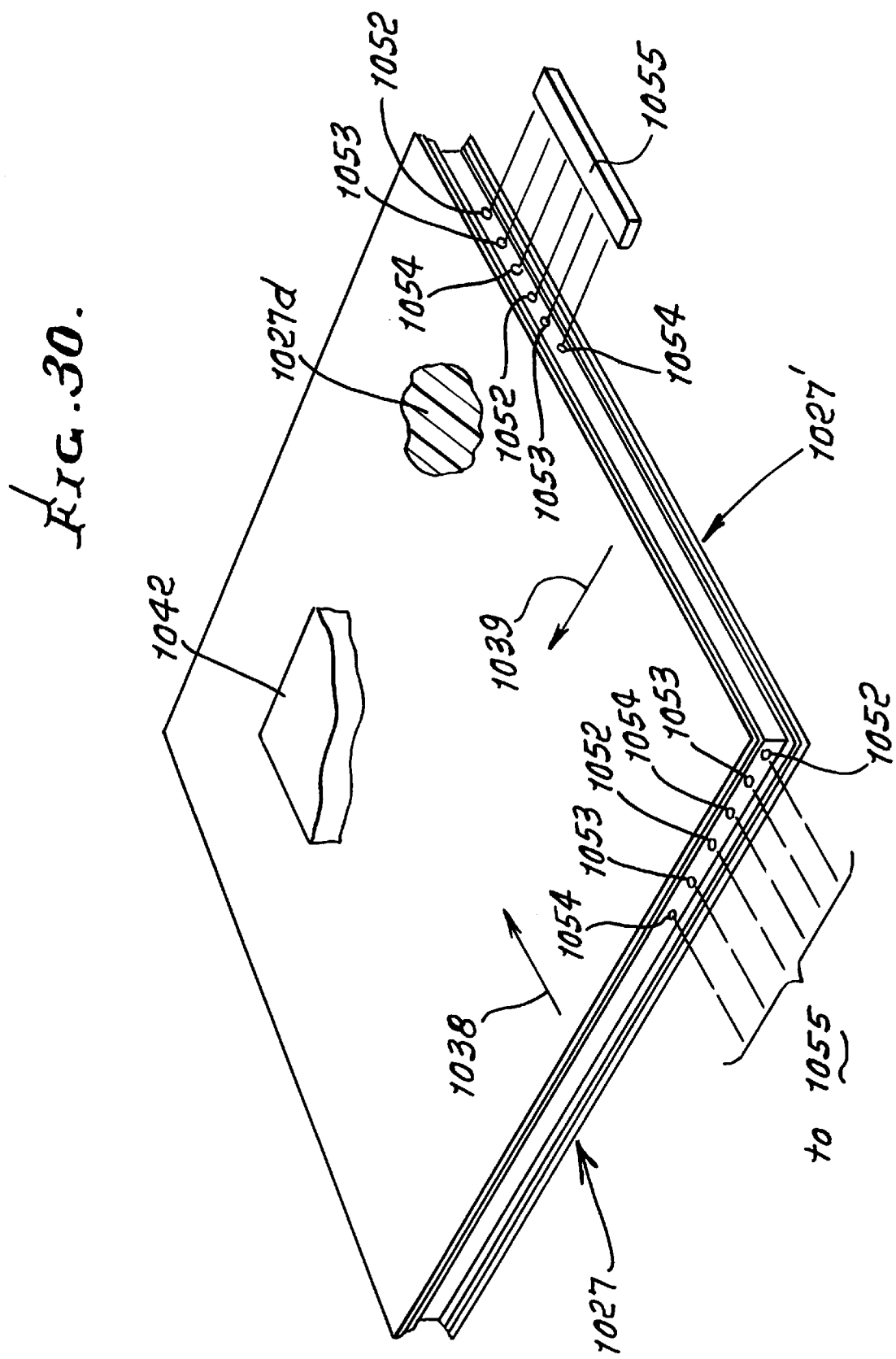

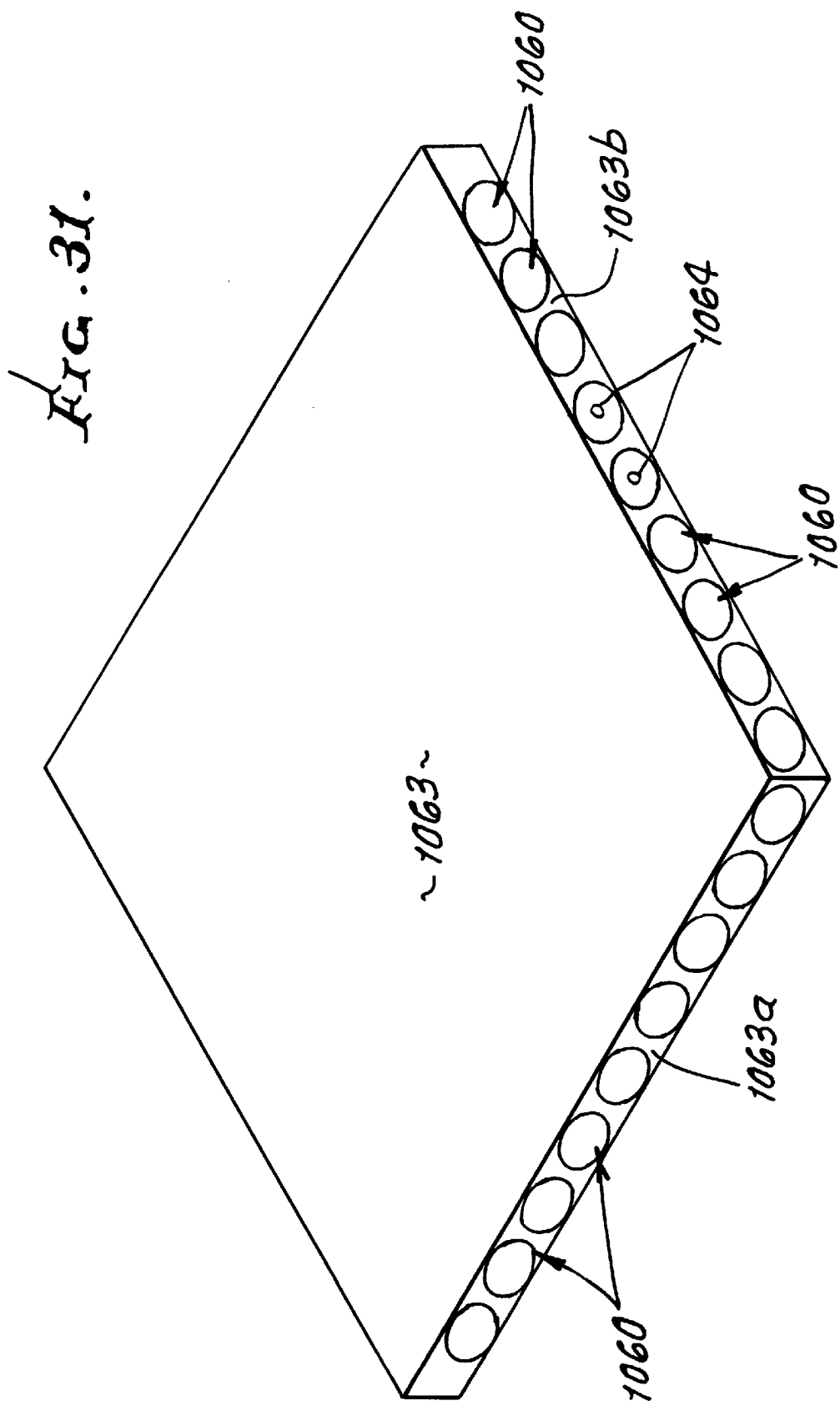

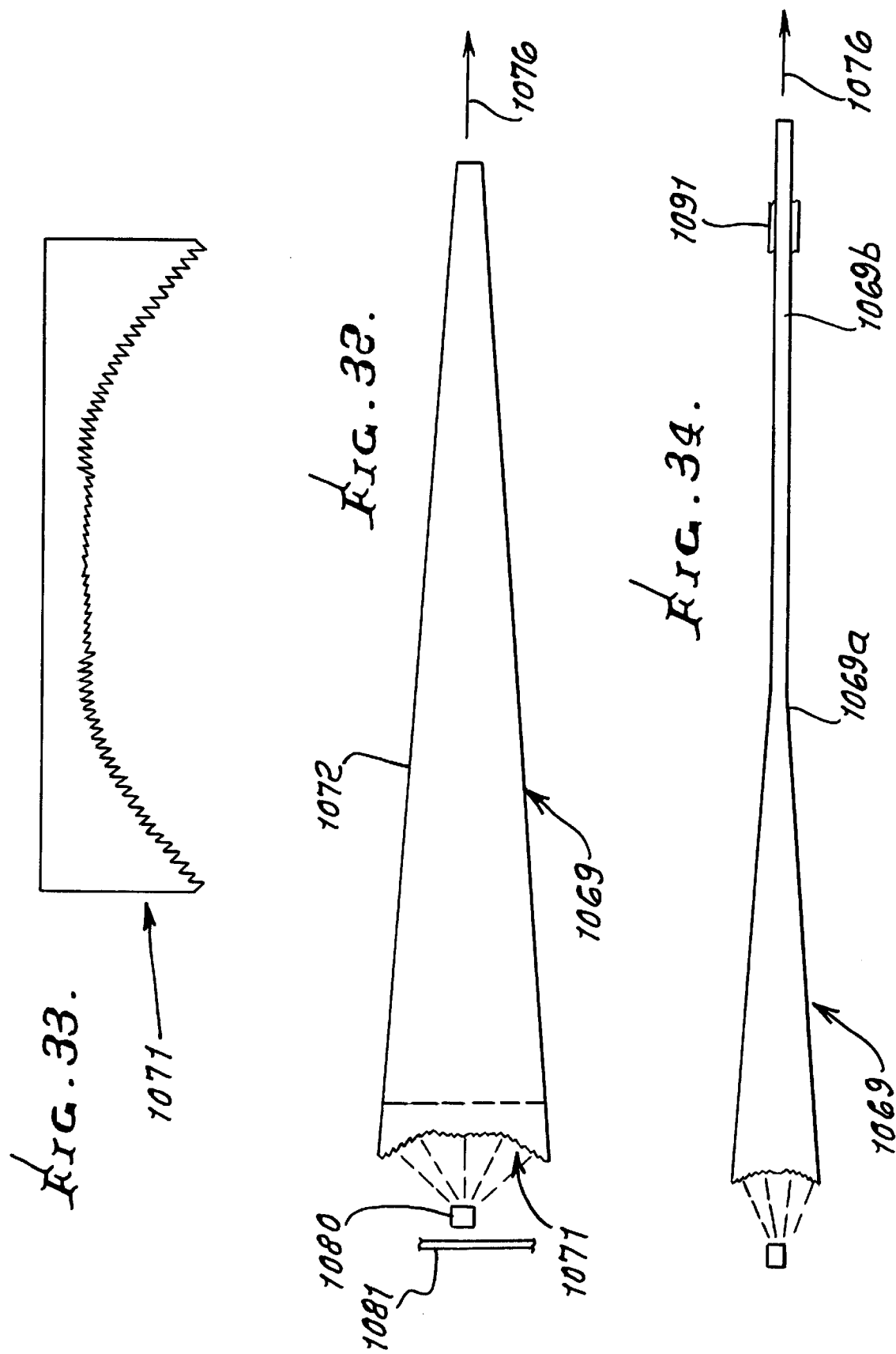

TIR LENS FOR WAVEGUIDE INJECTION

This application is a continuation-in-part of prior U.S. application Ser. No. 08/415,274 filed Apr. 7, 1995, now U.S. Pat. No. 5,577,492, issued on Nov. 26, 1996, which is a continuation-in-part of prior U.S. application Ser. No. 07/869,003 filed Apr. 16, 1992, now U.S. Pat. No. 5,404,869.

BACKGROUND OF THE INVENTION

This invention relates generally to radiant, particularly electromagnetic, energy concentration, redirection, and manipulation, and improves over the subject matter of U.S. Pat. No. 4,337,759. It more particularly concerns apparatus and method for employing a transparent lens means with elements thereof using Total Internal Reflection (TIR), in conjunction with a focusing second lens and a wavelength selection filter, for use such as in laser spectrometry.

Radiant energy is redirected to or from a predetermined zone or zones; such redirection having a predetermined degree of concentration and/or chromatic dispersion. The zones have sources of light, as in photoillumination, or radiant energy receiving means for conversion of the redirected energy to thermal, electric, chemical, or mechanical forms.

The prior art of radiant energy concentration and illumination in general consists of two major types, as exemplified by refractive and reflective astronomical telescopes: a refractive lens positioned in front of a receiver or light source, or a retro-reflective mirror positioned behind a receiver or light source. The corresponding devices in the prior art of solar energy concentration are the Fresnel lens and the parabolic reflector, which focus solar energy on a target. Furthermore, there are non-imaging, reflecting concentrators that have the advantage of fixed daily (non-tracking) position with only seasonal adjustments, but the disadvantage of requiring relatively large reflector areas and delivering only relatively low energy concentrations.

Fresnel lenses are devices comprising purely refractive elements, but they have physically inherent limitations of redirecting radiant energy that give high f/ratios and bulky concentrator structure. Moreover, linear Fresnel lenses have, for off-angles in the direction of the grooves, focusing errors, that are also inherent in the laws of refraction, and that limit one-axis tracking configurations to relatively low concentration.

Parabolic reflector concentrators have seen widespread use, but are subject to losses of received radiant energy because the receiver is situated between the source and the reflector, which is thereby shaded, preventing in particular the utilization of large heat engines at the focus. Furthermore, the receiver is exposed to environmental degradation and thermal losses; and the inclusion of a protective transparent cover means about the receiver will merely reduce the system's optical efficiency.

Another reflecting system has appeared in the literature, as reported by Rabl in *Solar Energy*, Vol. 19, No. 5. It employs a retro-reflecting means with elements that have two TIR faces to redirect radiant energy out the same side as it came in. Its only improvement over a metal mirror of the same shape is a potentially higher reflectivity; but the double internal reflection doubles the sensitivity to manufacturing error over that of the present invention, which redirects radiant energy through itself with only a single reflection.

SUMMARY OF THE INVENTION

It is a major object of the TIR lens to overcome the above-described problems of, and difficulties with, the prior art, and to provide a means to collect and employ radiant energy in a very cost-effective and efficient manner, using a new basic tool with applications that include the collection, concentration, redirection, and wavelength separation of radiant energy.

The present invention, which improves over the subject matter of U.S. Pat. No. 4,337,759, is basically characterized by the use of a transparent means employing elements to redirect radiant energy by means of TIR alone, or in conjunction with refraction, such means positioned between the radiant energy source and a receiver. Each element redirects radiant energy upon a common target zone or zones, during the energy's internal passage through the element. A properly oriented ray enters through the entry face and strikes the reflective face, which redirects it toward the exit face, the three faces comprising the active faces for that ray. In addition, the lens means is associated with at least one of the faces for redirecting radiant energy passing between the entry and exit faces via the TIR face.

Accordingly, the present invention is characterized by the passage of redirected radiant energy entirely through the transmitting body means and out the opposite side from which it entered after transmission via associated lens means. This invention constitutes a third class of radiant energy concentrators that also has applications to other forms of radiant energy redirection than concentration, such as wavelength separation or collimation. Other surfaces of the element may be inactive for the ray of interest (e.g., as in solar energy concentration of relatively parallel rays) but may impinge upon improperly oriented rays (e.g., diffuse skylight of off-angle sunlight).

The TIR elements may be contiguous, forming a transparent cover means, or separated to allow undeflected light to pass between them, for example to be focused by a mirror upon the back of the target, which is thereby illuminated from all directions.

Each element may redirect all of the parallel rays entering it into a single new direction, or split them into several directions, with or without wavelength separation, which can be controllably achieved by the independent, non-normal angling of the entry face and/or the exit face to the parallel rays being redirected, or achieved by diffraction gratings upon the exit face, which can be implemented by the replicative techniques of binary optics.

While TIR alone is limited to incident angles greater than the critical angle and therefore to any redirective bend angles less than 180°−2·critical angle (about 96° for acrylic), additional redirection is possible with or without wavelength separation by the above-mentioned, non-normal angling of the entry and exit faces. Such large bend angles enable a given diameter transparent means to be much closer to the target than a means limited to refraction alone, thereby greatly reducing the necessary support structure. Furthermore, a transparent means employing up to 90° bend angles can utilize a flat mirror extending from the target to the rim of the means, thereby doubling solar concentration or doubling intercept efficiency for a light source.

Since a given acceptance angle (of deviation from parallelism) produces a proportional requirement for target size, the target can be bisected by the plane of the mirror, and result in an actual target of half the original size, with no decrease in acceptance angle, by insulating the half of the target facing away from the redirected body means. Conversely, the target can be doubled in size to give a doubled acceptance angle, and then halved by the mirror back to its original area. This surprising potential for halving thermal losses is unique to the present invention, being unavailable for the parabolic reflector of 90° rim angle because the plane mirror would shade the aperture, and also unavailable for the Fresnel lens because of its far lower rim angle.

Unlike the Fresnel lens, chromatic aberration is completely independent of bend angle and can have any positive, zero, or negative values desired for such wavelength-separation applications as solar illumination or bandgap-tailored photovoltaic cells. Unlike the parabolic reflector, the redirective bend angle of an element is independent of its location, greatly adding to design flexibility. (Since the parabolic reflector is a smooth continuum, there can be no arbitrary variations in redirective bend angle from one spot to a neighboring one.)

The first of the present invention's improvements over the subject matter of U.S. Pat. No. 4,337,759 is the curvature of the faces of the individual lens elements. This curvature may be provided at one, two or all three of the faces (entry, exit and TIR) and, for example, may constitute a concave entry face, a convex exit face, and/or a convex TIR face.

Radiant energy handling is thus improved over a flat-faceted face system, as for example in redirection of rays from a line or point source, within constraints of interior shadowing and TIR face slope, to produce either parallel or converging output beams in a system using multiple faces. Also, improvements in ray collimation and focusing are realized, and design freedom is enhanced, since each face can be individually curved or various combination of face curvatures can be employed to minimize aberrations, due to the finite size of the facets.

For ease of quality control of manufacturing, the curved facet faces can form spheres with centers on the axis of rotational symmetry of the lens. When an axially symmetric lens is made by molding a rigid material, undercut interior faces are precluded, which limits the curvature of those faces. This constraint is not applicable to elastomeric lens materials.

The facet design of the TIR lens has four degrees of freedom: the angle of the entry face, the angle of the TIR face, the angle of the exit face, and the position of the inwardly adjacent facet. A full design solution requires that four requirements be used to derive these four angles. In many of the designs illustrated below, prearranged choices restricted the degrees of freedom. In general, however, the requirements are:
 a) the redirection of light from source to target;
 b) the full interception of light by the TIR face;
 c) the full illumination of the exit face, for maximum thermodynamic efficiency; and
 d) the non-interference of a facet's input and output rays by the next facet inwards.

Typically, a TIR lens is generated from the outermost, or rim, facet inwards in a facet-by-facet, numerically controlled iteration. The four requirements form a set of nonlinear equations in four unknowns to be solved for their roots. Because there is no general method of solving such equations, typical computer routines apply a matrix inversion method that assumes quasi-linearity in the neighborhood of the solution hyperspace. This requires some prior knowledge of this hyperspace so that a starting point for the solution search is within the quasi-linear regime. This prior knowledge depends upon whether the facet is triangular or quadrilateral. The former give wider interfacet slot angles and thus are easier to make; but the latter add another degree of freedom, enabling a wider choice of overall lens shapes.

The angle of this fourth, optically inactive, side of the facet would typically be set at the minimum draft angle for pulling the lens from a mold (about 2°). In the case of small lenses with only a few facets, there is also the possibility of an adjacent facet being larger or smaller than its neighbors, in order to raise the lens height and improve collimation.

The relative facet positions, as determined by the non-interference criterion, determine the overall lens profile, which should be low or high depending upon the application. In a solar concentrator, the lens height should be minimized to reduce spot size of the solar image. In a converging or collimating TIR illumination system, it is advantageous to have somewhat more lens height, so that the apparent size of the source is reduced at the central facets, and the output beam is thereby tightened. This consideration does not hold for diverging TIR lenses, because only efficiency, and not beam tightness, is required.

An important use of facet curvature is in a small TIR lens with only a few facets, such as a collimator for a light-emitting diode. Molding very small facets may be undesirable because of difficulties in making the mold. Curved facet faces enable relatively large facets to perform as accurately as small ones. Lenses for light-emitting diodes are of interest for red lamps at the rear of automobiles. In fact, the TIR lens can be incorporated into the conventional transparent cover of an LED, greatly improving its luminous efficiency.

Further improvements over the subject matter of U.S. Pat. No. 4,337,759 are: a lens that redirects light from a source in order to focus it on a spot in front of the lens.

There are two reasons that the TIR lens is superior to conventional ellipsoidal reflectors for this application. First, the lens and its associated planar back mirror collect all of the output of a light source and focus it. The ellipsoidal reflector typically collects only a fourth of a source's output.

Second, facet configurations are possible with efficient focusing power; that is, at the center of the focal spot, the entire lens would appear to be as bright as the light source itself, a condition known as "full flashing", important for the proper functioning of microfiche and slide projectors. Because of astigmatic aberrations inherent in the ellipsoidal reflector, it is never fully flashed, producing instead a much broader focal spot. Full flashing by the TIR lens is made possible by faceting of the exit so that stairsteps have their "risers" parallel to inner rays then emerging from the exit face. Then, the full exit face of the facet must be illuminated by light from the TIR face, a condition that can be fulfilled by curvature of the TIR face.

Furthermore, the exit face can have about the same refractive bending as the entry face, preventing unwanted image magnification that broadens the focal spot. The individual convex curvature on each of the facet faces is vital to the success of this design:
 entry-face curvature enables the entire TIR facet to be utilized, through a slight convergence that prevents any light from missing the TIR face;
 TIR-face curvature enables the entire exit face to be illuminated, by preventing any light from striking the stairstep risers or the adjacent TIR face; and
 exit-face curvature focuses light onto the target, eliminating the effects of finite facet size.

This focusing configuration would have two prominent applications that considerably improve the light utilization efficiency of the prior art: imaging projectors for slides, motion pictures, or microfiche. Current designs use ellipsoidal reflectors that have inherently low intercept efficiency (i.e., the fraction of the source output that actually ends up in the output image of the device).

The TIR lens of the present invention can be used in conjunction with an aspheric lens in order to remove the cosine-4th illumination non-uniformity typical of the prior art. This version of the TIR lens typically has stepped exit faces, with the risers angled parallel to the converging rays, to ensure spatial continuity of the focal cone. The faces of the facets can be curved so as to augment the action of the auxiliary lens.

Another advantage of the TIR lens for this application is that it azimuthally smears out any structure in the source, removing a source of pattern noise that is inherent in the imaging action of an ellipsoidal reflector.

Illumination injector for optical fiber bundles and light pipes. Prior art here also uses ellipsoidal reflectors. The TIR lens would have a focal cone half angle matched to the acceptance angle of the target.

Light-gathering means for spectrometers that analyze the diffusely emitted light of samples that have been stimulated to produce Raman or fluorescent light.

Conventional spectrometers typically collect this light with microscope objectives, which also deliver tightly focused (50 micrometers) laser light to the sample. These objectives typically have a focal length equal to their diameter, so that they subtend about 50° and collect 5% of the diffusely emitted output.

The converging TIR lens can collect over half of this emission, a factor of ten improvement, greatly aiding spectral analysis because of the greater signal to noise ratio.

A TIR lens that redirects light from a source in order to form a diverging cone of light, as in floodlighting applications.

For cone angles of 45° or less, this lens is more efficient than a conventional congruent reflector and much more compact. This divergence can either be for uniform illumination, or it can take the appearance of effectively coming from a virtual source located behind the lens, with appropriate facet-face curvatures compensating for the different distances of the facets from the source.

Two types of linearly symmetric TIR lenses for cylindrical sources (such as fluorescent tubes):

One that confines its output to a relatively narrow off-axis angle. With the prior art, this is possible only with quite deep and bulky reflectors.

One that reduces its on-axis output and enhances the lateral output, in order to produce uniform illuminance on a nearby surface that is being used for indirect lighting. Such a shape appears very different from other TIR lenses.

Linear TIR lenses have somewhat of a handicap from sagittal ray internal reflection, whereby rays emitted from the linear source at a large out-of-plane angle with the lens cross section will encounter the exit face at a total incident angle that exceeds the critical angle for total internal reflection. Most of the facet designs used in radially symmetric lenses will, when put into linear lenses, be subject to this whenever the out-of-place angle exceeds 40°, which encompasses half of all rays emitted from a Lambertian, or uniformly emitting, source. This trapping of light within the lens can be remedied by corrugation along the outer face of the lens, which unfortunately precludes manufacturing by extrusion because the cross section is no longer constant. Another method is binary optics outcoupling through miniature stepped patterns on the outside of the lens.

A more useful lens design would be applied to a toroidal fluorescent lamp. The TIR lens profile would have its axis of symmetry over the circular cross-section of the toroidal lamp. The complete lens would be a figure of revolution with its axis being that of the toroid rather than the center of the lens profile. The more slender the toroidal lamp, the better could its light be controlled by the lens.

Presently, there are no reflectors that can collect the light of such a lamp and put most of it into a forward-going beam. This toroidal TIR lens would be very useful for battery-powered fluorescent lanterns, which currently cannot provide any focusing whatsoever.

A collimating TIR lens made of silicon: because of the high refractive index of this material, the refractive faces of its facets would be somewhat differently angled than those of a glass lens. The application for a silicon lens is for the collimation of infrared light and the exclusion of visible light (because silicon absorbs all wavelengths shorter than 1.1 micrometers).

The purpose of this application is the jamming of the guidance sensors of heat-seeking, anti-aircraft rockets by focused beams of pulsating infrared light. The prior art uses much less efficient parabolic reflectors in conjunction with a silicon window. The silicon TIR lens would be an important new kind of infrared illuminator, as found in many night-vision systems.

The superiority of the present invention can be seen in its application to prisms with curved cross sections, arrays of connected linear or toroidal prisms acting in concert, redirection of rays from a line or point source, concentration of spherical or plane waves, better collimation than parabolic mirrors, and more efficient focusing than ellipsoidal mirrors.

Another object of the invention is to provide a radiant energy redirecting system comprising:

a) a radiant energy transmitting body means, b) that means comprising multiple elements, each of which acts as a radiant energy redirecting module, having on its cross-sectional perimeter an entry face to receive incidence of the energy into the interior of the perimeter, an exit face to pass the energy to the exterior of the perimeter in a direction towards the reverse side of the body from the side of the incidence, and a Totally Internally Reflecting face angled relative to the entry and exit faces to redirect towards the exit face the radiant energy incident from the entry face, c) the body means generally redirecting incident radiant energy towards a predetermined target zone situated apart from and on the reverse side of the body relative to the side of the incidence, d) first lens means associated with at least one of the faces for redirecting radiant energy passing between the entry and exit faces via the Totally Internally Reflecting face, the redirected radiant energy being collimated, e) and second lens means spaced from the exit face to receive the collimated radiant energy and to redirect same toward the target zone.

Yet another object of the invention is to provide a TIR lens and waveguide system, wherein light passed by the lens is optically coupled into the waveguide. The lens and waveguide may be directionally elongated and may taper in that direction; and the TIR lens may couple between a light source, such as an LED, and the waveguide. The waveguide may comprise a plate having elongated edges; and the TIR lens may extend adjacent such an edge or edges. Multiple TIR lenses and associated LEDs may be located along such a waveguide edge or edges, as will appear.

These and other objects and advantages of the invention, as well as the details of an illustrative embodiment, will be more fully understood from the following specification and drawings, in which:

DRAWING DESCRIPTION

FIG. 1 is a vertical section in elevation showing one form of apparatus embodying the invention;

FIG. 3 is an enlarged section on lines 3—3 of FIG. 2;

FIGS. 4a–4e are enlarged sections through elements of various configurations;

FIG. 7 is an enlarged section through a collimator as used in FIG. 6;

FIGS. 8, 9, 10a, 10b, 11, 13, 14 and 15 are schematics showing different applications of the radiant energy concentrating means;

FIGS. 12a and 12b are fragmentary sections showing modified concentrators;

FIGS. 16–18 show various curved lens surface arrangements;

FIG. 20 is a section of a facet with three curved faces, illustrating the general principles of facet design;

FIG. 21 is a section showing a further modified radiant energy concentrating means for use with a light-emitting diode;

FIG. 28 is an enlarged perspective view of a TIR lens injecting light into a planar waveguide;

FIG. 29 is a side view of a planar waveguide, with TIR lens facets at its edge, for injecting light from LEDs into the waveguide, and showing light from the waveguide illuminating a liquid crystal display;

FIG. 30 is a perspective view of linear TIR lens facets extending edgewise of a planar waveguide;

FIG. 31 is like FIG. 30 but substitutes multiple discrete TIR lenses arrayed along an edge or edges of a planar waveguide;

FIG. 32 is an edge view of an elongated waveguide with a TIR lens at one end thereof;

FIG. 33 is an enlarged endwise view of the FIG. 32 TIR lens; and

FIG. 34 is a view like FIG. 32 showing the waveguide having an optical fiber or rod continuation.

DETAILED DESCRIPTION

Figure 2:
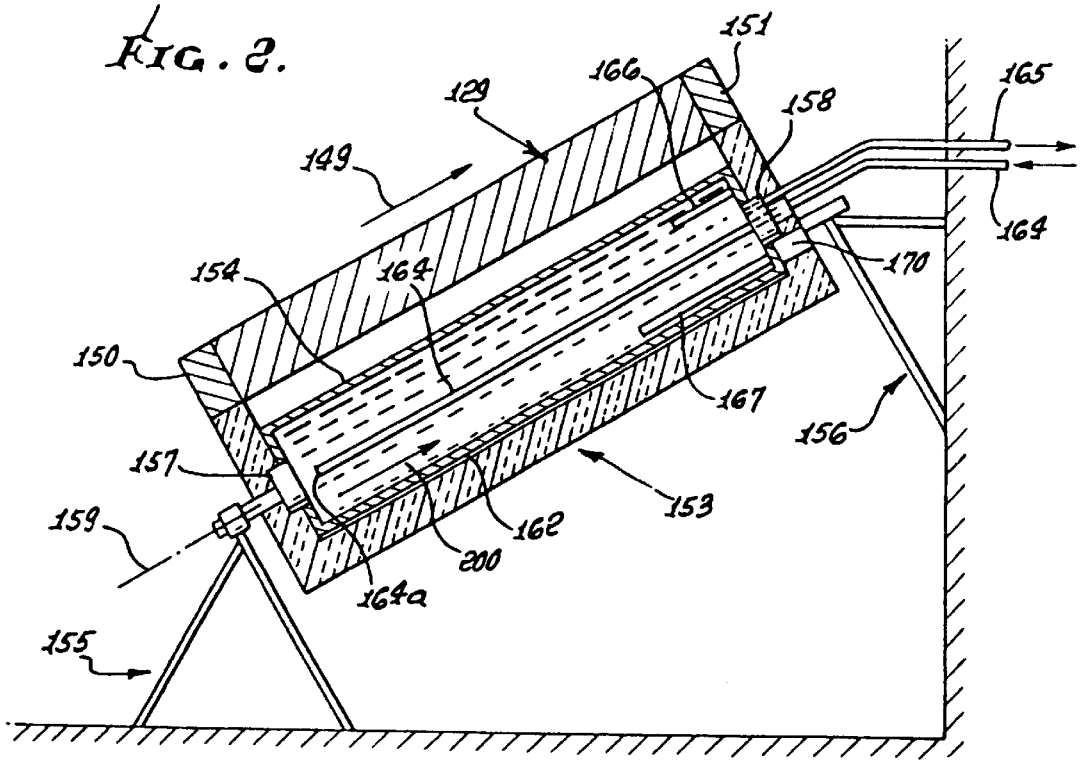
FIG. 2 is a vertical section in elevation showing another form of apparatus embodying the invention.

As described in U.S. Pat. No. 4,337,759, and referring to FIG. 1, radiant energy transmitting body means 10, in the shape of a cover or dome, has multiple facets or elements as at 11, each facet having an entry face to receive impingement of such radiation, an exit face to pass energy to the exterior of the body, and an internal reflection face angled relative to the entry and exit faces to reflect radiant energy incident on the reflection face toward the exit face. For example, in FIGS. 1 and 4d, a selected facet 11 has, in vertical cross section, an entry face 12 made up of stairstepped faces 12a and 12b, an exit face 13 facing the zone of target 15, and an internal reflection face 14. Radiant energy, such as light, is represented by rays 16a and 16b entering the body means 10 at flat face 12a and normal thereto, and passing internally of the facet for reflection by face 14. For this purpose, the face may be silvered at 17. The reflected rays 16c then pass toward and through exit face 13, normal thereto, and directly toward the target zone.

The body means 10 may consist of solid transparent material, such as glass or plastic, for example.

The multiple facets 11 shown in FIG. 1 may extend annularly about and define a common axis 18; or they may extend in parallel relation (normal to the plane of FIG. 1) at opposite sides of a plane as alternatively represented by 18, and which is normal to the plane of FIG. 1. In either event, corresponding points on the facets define a concave surface, as for example at 21 (defined by the tips 22 of the facets closest the target), and characterized in that radiant energy passing through the exit faces is directed generally toward the target zone. Tips 22 are formed at the intersections of the faces 13 and 14. Surface 21 is parabolic.

The series of facets in FIG. 1 is further characterized by the existence of tapered gaps 23 between adjacent faces 24 and 14 of the projecting portions of the facets. Faces 24 are inactive surfaces, i.e., do not pass the radiation. See for example representative rays 25 and 26 in FIG. 1. Ray 25 is redirected by its associated facet almost 90° toward the target, near the outer edge 27 of the TIR lens 10. Study of FIGS. 1 and 4 will show that angle α (the bend angle of the ray) increases for facets increasing in distance from axis or plane 18; and that angle β (the angularity of face 14 relative to a line or plane parallel to line or plane 18) increases for facets increasing in distance from 18. Also, the entry faces 12 form stairstep patterns.

FIG. 1 further shows a Fresnel lens 29 associated with TIR lens or body 10, and located at a mid-portion of the latter; thus Fresnel lens 29, which refracts incident radiant energy toward target 15, is located in the path of rays 30, which are redirected the least, i.e., at the smallest angles, toward the target. Lens 29 may be integral with lens 10, for example.

Further, a reflector or mirror surface is shown at 30 spaced from and facing the facets at the target side thereof. Surface 30 is arranged to reflect stray or divergent radiation from the extreme outward facets toward the target. See ray 31 in this regard, and reflection point 31a. This allows target 15 to halve the area exposed to heat loss that it would have without surface 30, since the bottom non-illuminated half could be well insulated.

Also shown in FIG. 1 is one form of means to controllably tilt the assembly of lenses 10 and 29 and reflector 30 to cause axis 18 to remain directed toward a relatively moving source of radiation, as for example the sun. In that example, a base plate 32 supports reflector 30, as well as the dome-shaped lens 10 and 29, via extreme outer edge portion 10a of the body means 10. A ring gear 33 supports plate 32, and meshes with spur gear 34. Drive motor 35 rotates gear 34 to controllably rotate ring gear 33, and control unit 36 controls motor 35. Unit 36 is responsive to photocells 37 and 38 in such manner that the photocells remain directed toward the light source. The photocells are suitably carried at 99 by the plate 32, as for example near its periphery.

Target 15 may for example comprise a fluid receptacle which is heat conductive, to transmit heat to fluid in the receptacle, as for example water in a pipe.

In FIGS. 2 and 3, the numerals 100 and 129 designate lenses corresponding to lenses 10 and 29 described above. They are elongated in the direction of arrow 149 and are carried by supports indicated at 150 and 151. V-shaped shroud 152 has edge portions 152a connected to the opposite edges of lens body 100, so that the shroud and lenses define an enclosure.

A second and insulative tubular shroud 153 extends within that enclosure, about a tank 154 which has fixed (nonrotatable) position. A support for the tank may take the form of legs indicated at 155 and 156, bearings being provided at 157 and 158 to allow tank and shroud rotation about central axis 159, along with the lens assembly. The shroud 153 is cut-away at locations 160 and 161 to allow entry of radiant energy from the lens assembly, to be absorbed by the tank, while heated air is prevented from escaping gap 162 by wipers 163; the enclosure has a reflecting interior surface 152b.

Cool liquid, such as water, enters the tank via pipe 164, is heated therein, and discharges into the tank lower end at 164a. Warmed liquid slowly flows at 200 back up the tank, being further heated by contact with the exterior of pipe 164, the liquid leaving the tank at outlet 165. A sacrificial anode 166 in the water 200 is adapted to corrode, electrolytically suppressing any corrosion of the tank itself. Also, a back-up heater 167 in water 200 is supplied with electrical current to heat water in the tank as when solar radiation is blocked or non-existent, as at night. An air-gap may be provided at 162 between shroud 153 and the tank itself. Sun tracking mechanism is indicated at 170, to rotate the assembly to maintain the sun's rays incident normally toward the lenses 100 and 129, i.e., in direction 171 in FIG. 3.

In operation, all radiation directed parallel to arrow 171 and striking the lenses 100 and 129, is redirected toward the tank, as facilitated by gaps 160 and 161, to heat the liquid in the tank. Also note windows 162 and 163. Wide angle, i.e., almost 180°, collection of the solar rays is employed, as described above in FIG. 1. The gap walls 153a are reflective, and may have other, curved shapes besides the straight lines shown here, for the purpose of secondary concentration. Stray radiation from the diffuse sources, such as skylight, is absorbed by blackening the surface 153a of shroud 153 and of lens support fin at 130.

Various geometric configurations of elements and arrays of elements are possible, wherein various element configurations have the same relative angles of the three active faces, but differing deployments within the transparent means; e.g., the TIR face can be in faceted slots on either side of the body means or on the walls of tunnels within the latter, while the entry faces can be on faceted steps or even on a completely smooth cover surface.

Figure 4C:
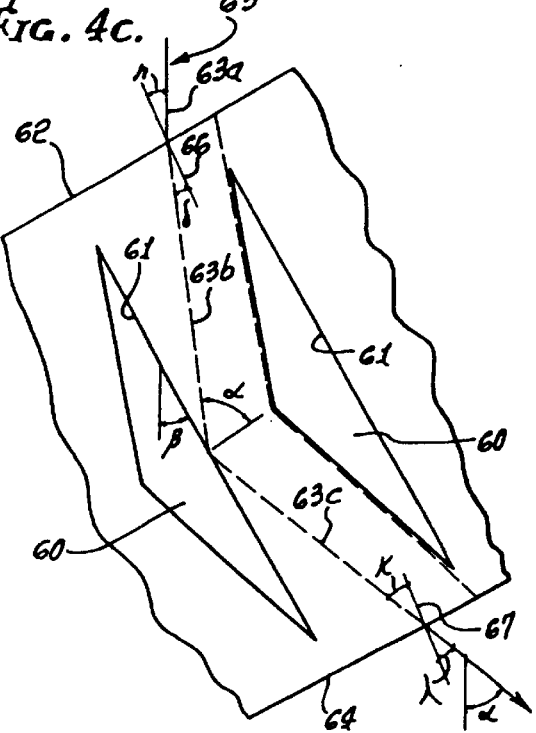

In FIG. 4a, tunnel 40 forms TIR face 41, while exit face 42 has stairsteps 42a and 42b. In FIG. 4b, slot 50 is on the entry side of the body means, having TIR face 51 and entry face 54. Exit face 52 has stairsteps 52a and 52b. In FIG. 4c, tunnel 60 forms TIR face 61, and entry face 62 and exit face 64 are on smooth continuous surfaces. However, TIR face 61 must be longer than TIR faces 41 of FIG. 4a or 51 of FIG. 4b, because of the refractive bending of ray 63 by entry face 62. In general, the length of a TIR face relative to facet width 65 is:

TIR LENGTH =cos δ/(cos η cos η) where η is the incident angle of ray 63a with surface normal 66, δ is the angle of the refracted ray 63b with 66, κ the incident angle of reflected ray 63c with exit surface normal 67, and λ the angle of refracted by 63d with 67. The relationships of these angles are given by Snell's law:

$$\sin \eta = n \sin \delta, \text{ and } \sin \lambda = n \sin \kappa$$

where n is the index of refraction of the body means material. For contiguous elements to redirect to a target all the parallel rays incident upon them, neighboring elements must be relatively positioned everywhere on or above a parabola with the target as its focus and a rim slope equal to half the rim angle (i.e., the redirective bend angle of the outermost elements).

Figure 4D:
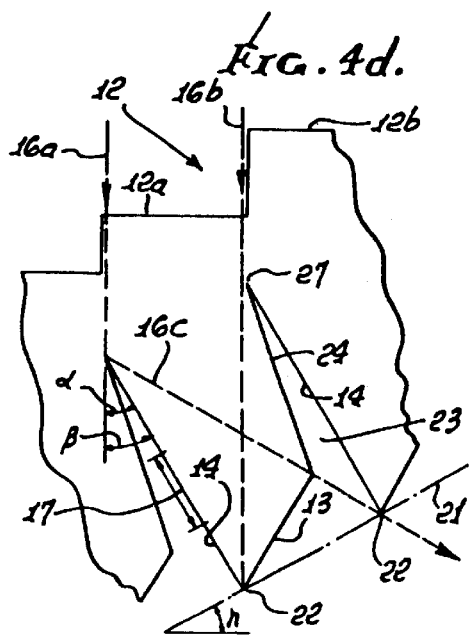

In FIG. 4d, "extreme" ray 16c must clear tip 22 of the inward adjacent facet, while the other extreme ray, 16b, must clear top 27 of slot 23. These clearance conditions require that the lens slope angle η be greater than or equal to the TIR tilt angle, which is geometrically equivalent to tangent line 22 being on or above the parabola.

Note that all of the configurations of FIG. 4 have the same bend angle α, and except for FIG. 4c, the same normal entry and exit faces. See for example the elements 311 of the "cover" 310 in FIG. 5, above the parabola 321 tangent to the tips 322. See also line 324. Those tips below the parabola, such as for a quarter-circle 325 with the same slope at the rim, would in this stairstep configuration suffer some inter-element impingement, about 10% for both cylinders and spheres; but the use of a thin, flexible, inflatable dome for a transparent cover means might be worth such a loss, especially since the untargeted rays would still be redirected to a locus within the cover means, to assist the pressurization by heating the enclosed air. See FIG. 11 for a non-impinging circular configuration.

An alternative facet style seeks to minimize such impingement losses by concentrating the rays before they strike the TIR face, which can thereby be smaller to reduce said impingement. Convex and concave entry and exit faces will do this, though with some decrement of the cover's concentration ratio or acceptance angle, which for some applications is far outweighed by bringing the transparent redirecting means even closer to the target.

For the smaller bend angles, difficulties are encountered in the narrowness required of the tunnels or slots 23 in FIG. 4d forming the TIR faces of the low bend-angle elements. This can be somewhat alleviated by raising the profile of the transparent means 310 above the parabola 321 to widen the slots and tunnels beyond their minimum widths. Another form of such an alleviation is a backbending exit face, 311 of FIG. 5, so angled that its refractive redirection opposes the redirection of the TIR face, which can thereby have a greater redirective bend angle with a less steep slope, giving wider tunnels or slots.

Figure 5:
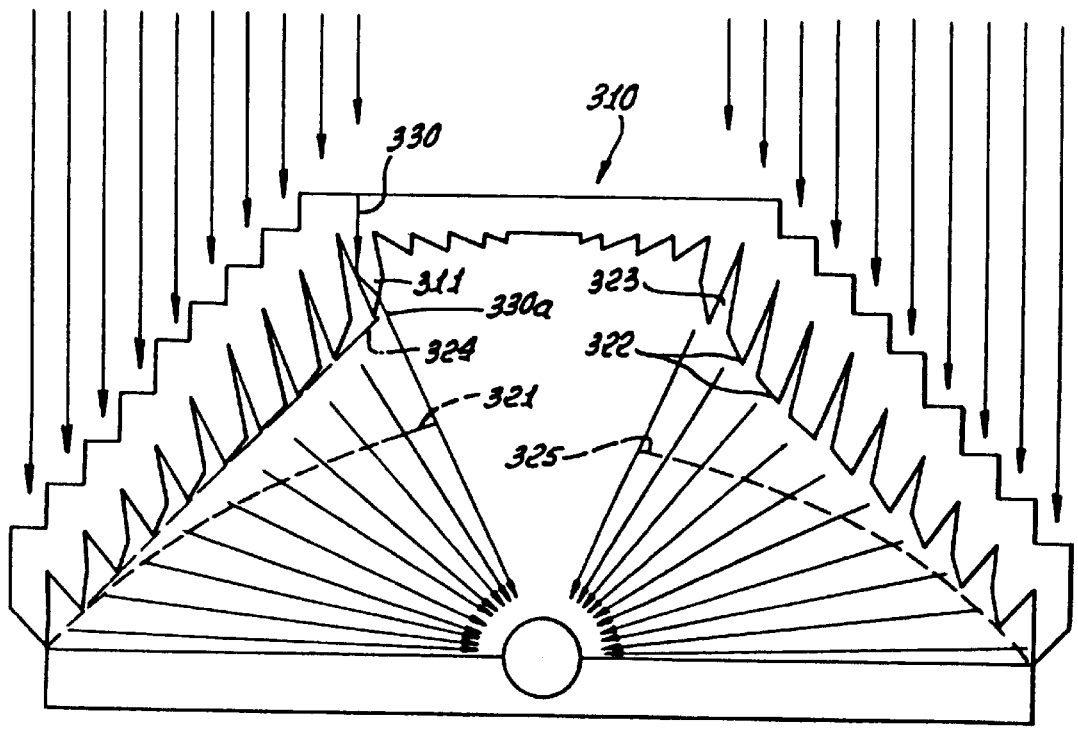
FIG. 5 is a view like FIG. 1 showing a portion of a solar optical concentrator of somewhat different and employed configuration.

In FIG. 5, note that ray 330 strikes the exit face 11 non-normally, so that ray 330a is bent back toward the target. This enables a wider slot 323 than if the exit face was normal and the TIR face was at a steeper angle. The above-mentioned convex entry face will also widen the slots or tunnels.

Another method of widening the slots is the faceted exit face, shown in FIG. 4e. Here slot 70 has been opened until it nearly impinges upon extreme ray 73b. Exit face 74 has miniature stairsteps 74a and 74b, respectively normal to and parallel to reflected ray 73b. Alternatively, a thin, microstructured series of elements of high refractive index (say n=4) can be embedded in the body means to form more favorably shaped elements. The particular manufacturing method and design application will determine the place of transition to a Fresnel lens, or alternatively to a window, that passes rays to a small parabolic reflector below the target, which is thereby illuminated from a full circle of directions.

Another possible configuration would have the outer parts of the redirecting means sending radiant energy to a central target while the inner parts redirected energy to outer targets using only large bend angles throughout. All these configurations are derivatives of the basic method of this invention: upon multiple TIR-transmitting elements, properly placed entry, exit, and TIR faces redirect radiant energy to a predetermined target zone, or into a predetermined target solid angle.

Also usable is a cover means (as at 10 or 110) whose focal length can be shorter than any parabolic mirror with concentrations twice as high, but which is free from shading and presents a convex surface with lower aerodynamic drag than the concave parabolic mirror. Its target is near the center of gravity and closer to the ground than that of the parabolic reflector making fixed receiver means easier to design and maintain. Finally, the nearly 100% reflective efficiency of the TIR faces give much greater potential for high efficiencies than does the parabolic mirror.

In FIGS. 1 and 5, it will be understood that the elements 11 and 311 join together, integrally and continuously, to form a radiant energy transmitting means in the general form of a cover. The latter has an energy entry surface (top surface in FIG. 1, for example) and an exit surface (bottom surface in FIG. 1) lying on opposite sides of the cover. The cover causes radiant energy leaving the exit surface to have a generally different direction than the direction of energy incidence on the entry surface. Also, multiple TIR faces are situated on the exit surface adjacent slots proximate the exit surface, as referred to above. The entry surface has a faceted stairstep configuration. The exit surface of the cover lies beyond and further from the target than a parabola (see 21 and 321). The cover may be constructed of transparent material, as for example plastic.

FIG. 8 schematically shows a means 410 corresponding to the means 10 of FIG. 1 or 310 of FIG. 5, or equivalent. A target zone is shown at 415. A retro-reflector means 412 is spaced behind and facing the target zone so as to redirect radiant energy upon the target zone. See ray 413.

FIG. 9 schematically shows a radiant energy source means (as for example a light source) at 430 at the target zone. Radiant energy emitted by the source means 430 is redirected by the body means 435 (like 10 or 310) in reverse relation. See ray 436.

Figure 10A:
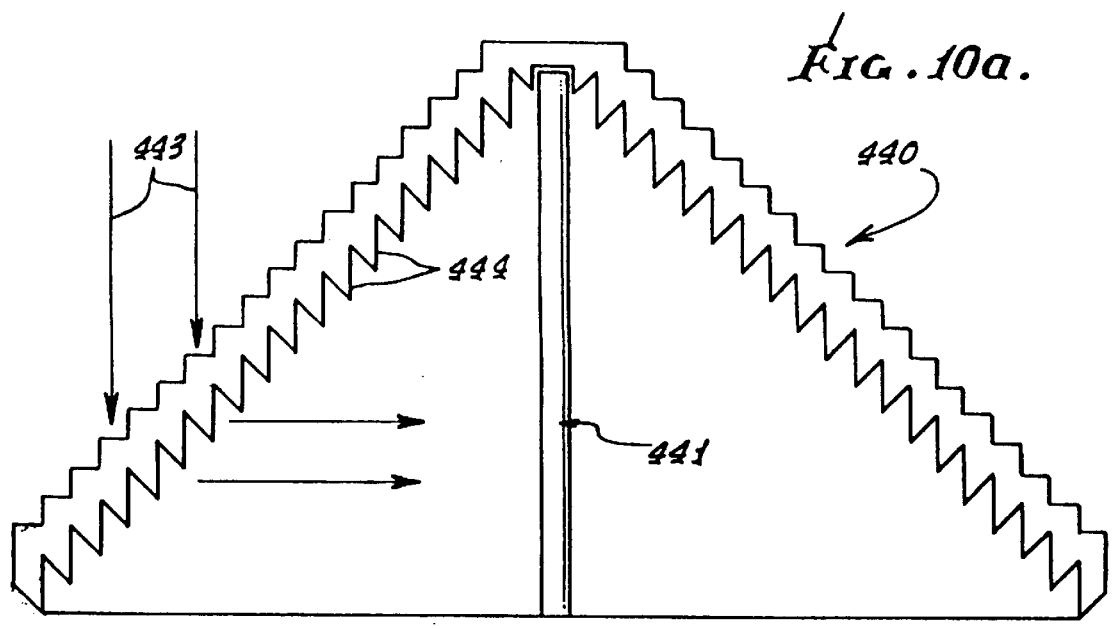
Figure 10B:
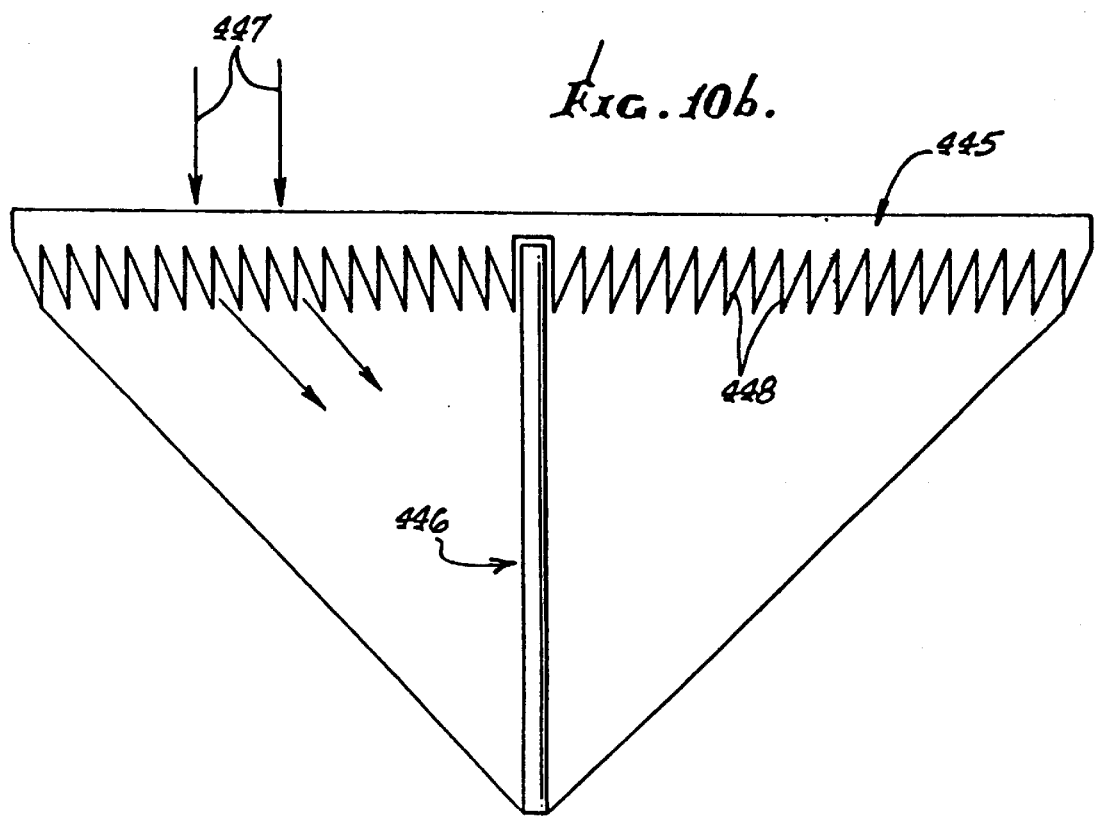

FIGS. 10a and 10b show two variations of a "uni-bend" lens with uniform facets extending annularly about a cylindrical target. In FIG. 10a, all the facets 444 of conical body means 440 bend rays 443 through 90° onto cylindrical target 441. In FIG. 10b, flat body means 445 has identical facets 448 bending rays 447 through 45° upon cylindrical target 446.

FIG. 11 shows a structural means 460 enclosing the space 461 behind the exit face of the cover means 459 (like 10 or 310), so that pressurization of the atmosphere of space 461 will hold the flexible cover means in its distended or circular shape, with center of curvature at point 426. See target zone 462, pressurization means such as a pump 463 and ray 464.

A thin film 465 adheres to the inside of cover means 459, having miniature sawtooth facets 467 as shown in the insert.

FIG. 12a shows a plurality (two for example) of target zones 470 and 471 to receive radiant energy from the transmitting body means 472 (like 10 or 310). Each element 473 redirects energy in a plurality of directions, toward the target zones. Thus, each element 473 may be like element 10 or 310 described above but have a TIR face divided into two sub-faces 474 and 475 at slightly different angles to accomplish the reflection of the two rays 476 and 477, respectively directed by the faces 474 and 475 toward the two target zones.

In FIG. 12b, TIR face 453 is the exit face for ray 451; while TIR face 454 is the exit face for ray 452. This symmetrical case of twin 60° bends may be varied to give two different right and left hand bends, with differing division of the incoming radiant energy.

In FIG. 13, the cover means 480 (like 10 or 310) has different groups of elements redirecting radiant energy toward different target zones. Thus, the elements at locus 481 direct radiant energy toward target 482; and the elements at locus 483 direct energy toward target 484. See rays 485 and 486.

Figure 6:
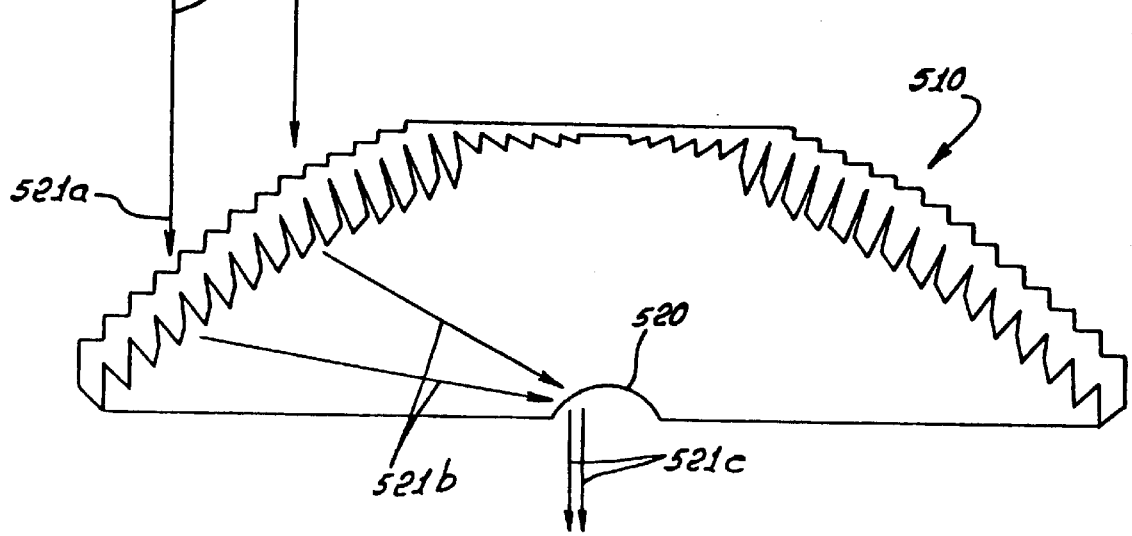
FIG. 6 is a schematic showing two devices, operating in conjunction, one of which is like that of FIG. 1 or 5, and the other being a collimator.

In FIG. 6, cover or body means 510 corresponds to 10 or 310 described above. A secondary radiant energy redirecting means is provided at 520 to intercept the radiant energy from body 510 and to redirect it. See rays 521 with segments 521a falling on body 510; redirected segments 521b falling on body 520; and secondarily redirected segments 521c transmitted by body 520.

FIG. 7 shows body 520 in detail, with entry faces 530, exit faces 531, and TIR faces 532. The rays 521c are parallel, in this instance, i.e., collimated, so that means 520 may be regarded as a collimator.

Figure 14:
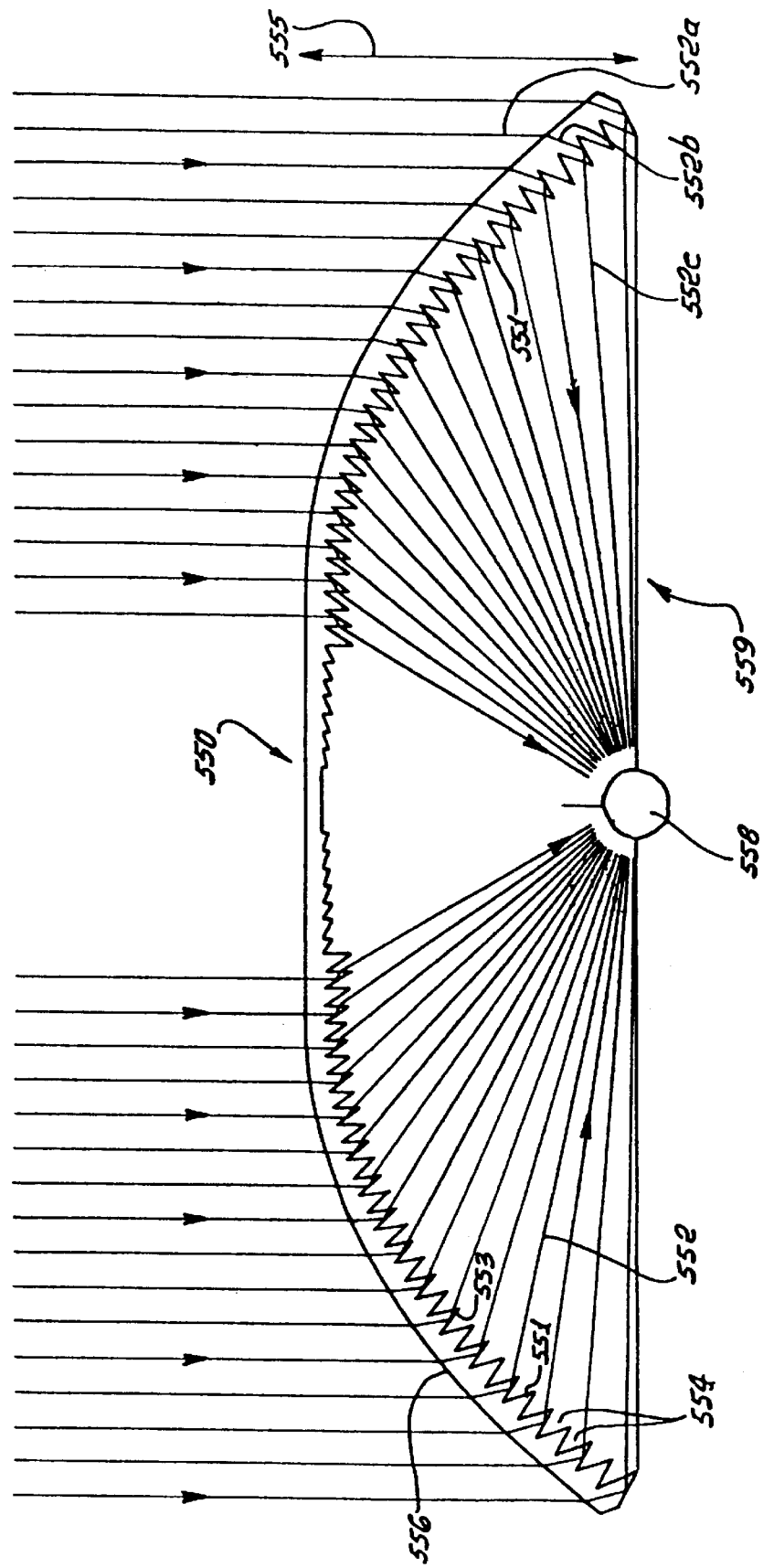

The means 550 shown in FIG. 14 is like 10 and 300, except that the exit faces 551 are individually angled relative to radiant energy passing through them, so as to cause reflective redirection of the radiant energy. See beam 552 refracted at face 551. Also in FIG. 14, the exit faces 551 may be considered to refractively redirect radiant energy in partial opposition to the redirection by the TIR faces 553, the latter extending at less steep angles (than in FIGS. 1 and 5) so as to widen the slots 554. Note also in FIG. 14 that the entry face is smooth and unfaceted, at 556, and that exit face 551 is parallel to refracted ray 552b, giving the maximum backbend and the lowest possible slope of entry surface 556, which in fact is lower than the parabola 321 or the quarter-circle 325 in FIG. 5.

In FIG. 15, the body means 560 is like that at 10 or 310, except that it utilizes the variation index of refraction that varies with the wavelength of the radiant energy, so as to constitute a wavelength separating, radiating energy redirecting, transmitting body means. Two target zones 561 and 562 are shown, and are spaced apart to receive different wavelengths of the wavelength separated, redirected, radiant energy. See incident ray 563 which separates into ray 563a of one wavelength directed toward target 561, and ray 563b of another wavelength directed toward target 562.

Also in FIG. 15, either target may be considered as a means to convert radiant energy to electricity. One such means is a photovoltaic cell. Such a device may be located at the target zones in FIGS. 1 and 5. In FIG. 15, one target may comprise a photoillumination means receiving visible wavelengths; and the other target may comprise a thermal receiver receiving invisible wavelengths at zone 561.

When a source of radiant energy is placed in zone 562, the visible wavelength rays will follow the reverse path of rays 563, i.e., be collimated, while the invisible longer wavelength heat rays will be diverged more outward from the visible beam, so that spotlights on actors will not subject them to a heat load several times greater than that of the visible radiation.

Certain aspects of FIGS. 1–15 were also discussed in prior U.S. Pat. No. 4,337,759.

FIG. 16 may be considered to correspond generally to FIG. 4a or FIG. 4b, i.e., to present a lens body 600 having an entry face 601, a TIR face 602, and an exit face 603 on the body 600. Such faces 601 and 603 may be faceted, as in the styles shown in FIGS. 1, 3, 7, 8, 9, 10, and 13. Rather than all such faces being flat, face 601 is convexly curved, away from the body 600, as shown; whereas faces 602 and 603 are flat, as previously described. Diverging entry rays 605 are refracted at 605a for reflection at 605b, and travel at 605c toward face 603. The rays pass through exit face 603 and are in general refracted to travel externally at 605d, as shown. If exit face 603 was convexly curved, then rays 605d could be converging. The curvature of entry face 601 eliminates the divergence and keeps any rays from missing TIR face 602.

In FIG. 17, entry face 611 is flat, as is exit face 613; however, TIR face 612 is concave toward the incident ray side of that face, as shown. Diverging entry rays 615 pass through face 611 and travel at 615a, within body 610, for reflection at 615b, at different points and angles, for travel at 615c toward face 613. The rays pass through that face, and are in general refracted, and travel externally at 615d, as shown. The curvature of the TIR face 612 has made rays 615d parallel, while restricting the amount of exit face 613 that is used, enabling the entire lens to have a higher profile.

In FIG. 18, entry face 621 is flat, as is TIR face 622; however, exit face 623 is concave away from the body 620, i.e., away from TIR face 622, as shown. Entry rays 625, which may be parallel, pass through face 621 and travel at 625a, within body 620, for reflection at 625b at different points and angles, for travel at 625c toward face 623. The rays then pass through that face and are in general refracted to travel externally at 625d, as shown. Exit face 623 is fully flashed, as would be desirable for a converging TIR lens.

Other possibilities are as follows:

|   | flat | convex | concave |
|---|---|---|---|
| A |   |   |   |
| entry face |   | x |   |
| exit face |   |   | x |
| TIR face |   | x |   |
| B |   |   |   |
| entry face | x |   |   |
| exit face |   |   | x |
| TIR face |   | x |   |
| C |   |   |   |
| entry face |   | x |   |
| exit face | x |   |   |
| TIR face |   | x |   |

Figure 19A:
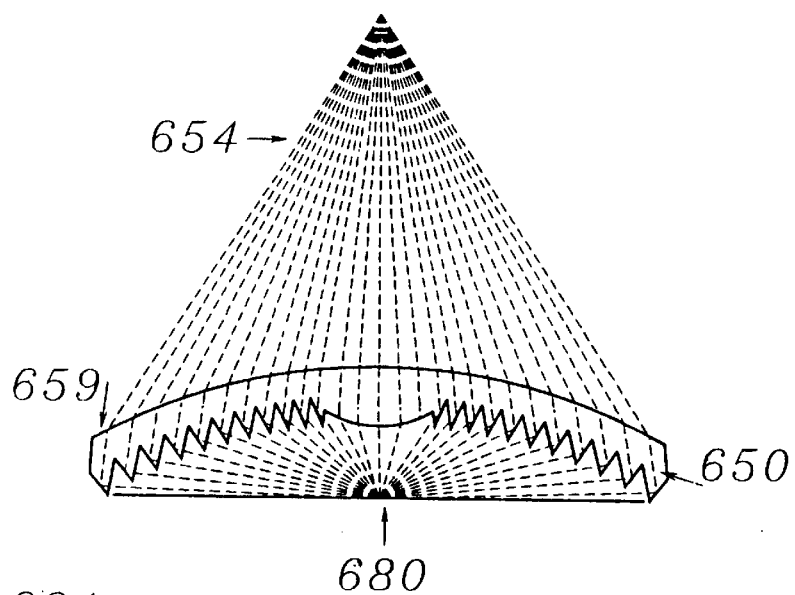
FIGS. 19a–19c are sections producing light rays of varying angularity, as shown.
Figure 19B:
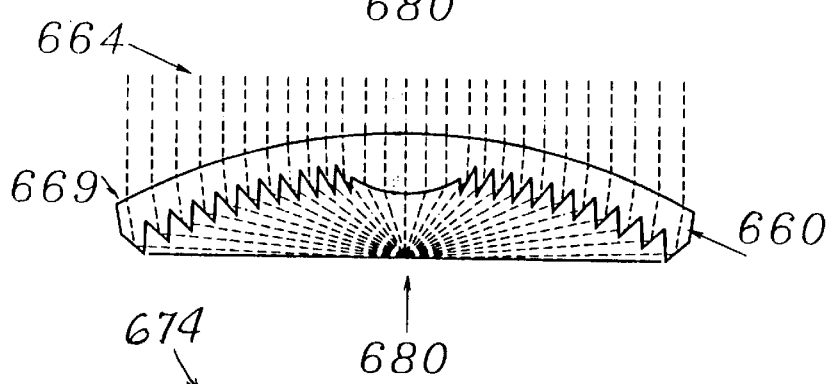
Figure 19C:
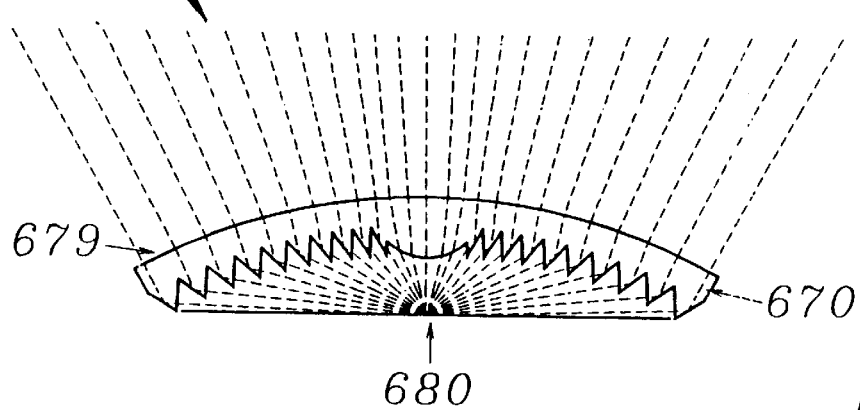

In FIGS. 19a, 19b and 19c, the bodies 650, 660 and 670 are closely similar to body 740 shown and described in FIG. 21. The angularities of the annular facets are slightly varied, so that the body 660 produces collimated light rays 664; body 650 produces converging light rays at 654; and a body 670 produces diverging light rays 674. The light source in each case is shown at 680. In each case, the top surface 659, 669, and 679 of the lens is circularly curved in the section shown, or spherically curved for an annular lens.

In FIG. 20, lens body 700 acts as a converging TIR lens, in the same manner as lens 650 in FIG. 19a. Its performance is superior because of its full flashing, which gives more effective focusing, and higher profile, and which leads to smaller angular magnification of the light source, and a smaller focal spot. Upper light ray 701 and lower light ray 702 are the defining rays for the calculation of the angles of the boundaries of facet 703 and of the position of inwardly adjacent facet 704. The slope of lens profile line 705 is to be maximized. The defining rays are generally diverging but can come from different parts of the light source; for example, upper ray 701 comes from the bottom of the light source, while lower ray 702 comes from the top of the light source, so that they constitute the extreme rays of all light emitted by the source.

If the facet-defining upper and lower rays are not the extreme rays of the light source, then some fraction of its output light will be redirected by the lens into the output rays. Such a case may occur if there is a tradeoff between this fraction and the tightness of the focusing, to be resolved by the particular application of the lens.

Facet 703 is defined by notch 703n (shown here as a fillet), tip 703t, upper point 703u of entry face 706, and on exit face 707, outer point 706o and inner point 706i. Inwardly adjacent facet 704 provides three limiting points that act analogously to pupils of conventional optical systems: tip 704t defines upper ray 701, while both notch 704n and outer exit face 704o must be cleared by lower ray 702. The convex curvature of entry face 706 accommodates the divergence of the defining rays by assuring that upper ray 701 does not miss TIR face 708 and that lower ray 702 does miss notch 704n.

For the sake of diagrammatic clarity, exit face 707 is relatively close to TIR face 708. A thicker lens with a more distant exit face would employ convex curvature (as on the TIR face 708c) to assure that the defining rays do not miss the edges of exit face 707. If they did miss, they would not be lost, since they would totally internally reflect on riser faces 709 or 710, and enter the lens output with only modest angular errors. Riser face 709 is angled to just clear lower ray 702, after it has left the lens. Optically inactive face 711 is kept at a minimum draft angle determined by the manufacturing method (for injection molds, it is typically 2° off the mold-pulling direction). Face 711 assists maximizing of lens profile by enabling entry face 706 to be angled more downward than is the case with lens 650 of FIG. 19a, where there is a straight line between a facet tip and the notch of the inwardly adjacent facet.

In summary, a unique determination of the four angularities of the facet (three for its faces and one for the lens profile) requires four conditions: (1) overall bend angle; (2) upper ray falling on the TIR face; (3) lower ray clearing notch of the inwardly adjacent face; and (4) lower ray clearing the outer edge of exit facet of the inwardly adjacent facet. The curvatures of the three optically active faces of the facet are individually determined:

(1) entry-face curvature helps to maximize the slope of the lens profile line, by allowing the tip of the inwardly adjacent facet to rise while keeping the higher upper ray from missing the TIR face (this reduces the divergence of the output light of the inner facets of the lens by increasing their height above the source);

(2) TIR-face curvature also helps to maximize lens slope by allow the notch of the inwardly adjacent facet to rise; in addition, TIR-face curvature enables the exit face to be fully flashed, an important characteristic for several illumination applications;

(3) exit-face curvature minimizes the size of the focal spot of converging TIR lenses, and minimizes the beam divergence of collimating TIR lenses.

Non-circular profiles of these curved faces may be selected in order to provide uniform illumination by the facet.

In addition, all the facets of the lens could be designed to have the same size focal spot, which would then be uniformly illuminated. This discussion of FIG. 20 may be considered an important aspect of the invention, improving over or not suggested by, subject matter of U.S. Pat. No. 4,337,759.

In FIG. 21, the axis of the annular, radiant energy transmitting body 740 appears at 751. The body has multiple annular facets 742 to 746 which are generally concentrically arranged but having tips 742d to 746d progressively closer to plane 750 normal to axis 751. Face 742a of facet 742 is convex toward face 742b; and face 742b is concave toward face 742a in the section shown. This relationship obtains for other facets, as shown.

A light-emitting diode (LED) 758 is located at the intersection of plane 750 with axis 751 and emits light rays toward the body 740. Ray 753 passes through face 742a, is refracted toward TIR face 742b and is reflected toward and passes through upper flat face 748. See also ray 752 passing through face 743a, reflecting at TIR face 743b, and passing through upper face 748a, angled as shown. All rays passing upwardly beyond faces 748 and 748a are collimated. The transverse width of the body 740 may be from 0.12 to one inch, for example, and the transparent body 740 may consist of molded plastic material. A refractive section without facets appears at 719. Smaller ratios of lens diameter to LED size may have outermost facets large, and successively inward facets smaller, in order to have a higher lens profile and better collimation curved facets are necessary for.

Figure 22:
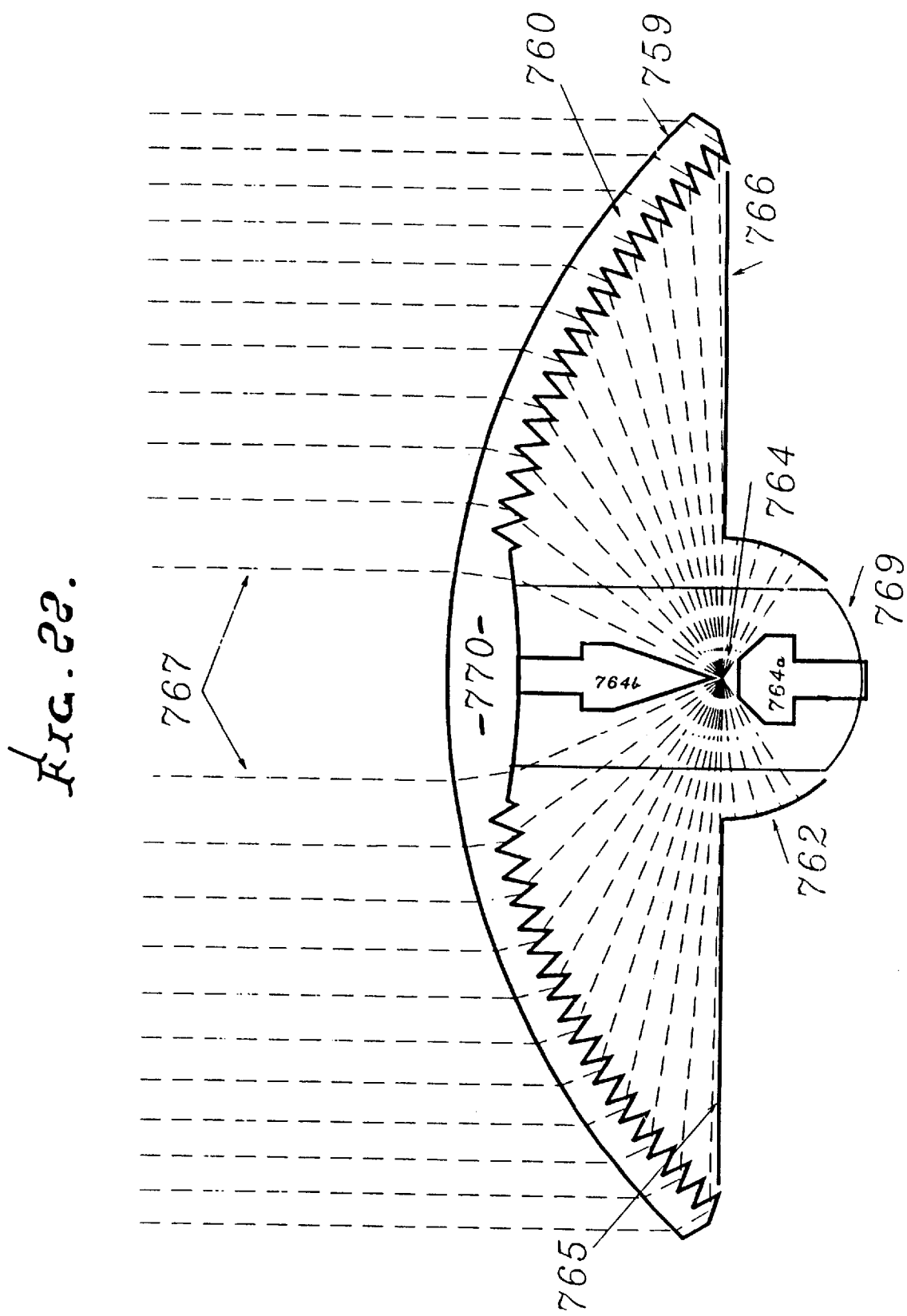
FIG. 22 is a section showing yet another modified radiant energy concentrating means made of silicon to pass infrared (IR) rays.

In FIG. 22, the radiant energy transmitting body 760 may have the same general construction as shown in FIGS. 20 and 21. The lens body 760 consists of silicon, or a similar material, for passing infrared rays, but blocking visible light rays, while transmitting infrared rays. An arc lamp radiant energy source is shown at 764, at the same position as the LED in FIG. 20.

A reflector surface 765 may be employed to extend in plane 766 corresponding to plane 750 in FIG. 21 with a parabolic section 762. The infrared rays emanating at 767 are typically collimated but may be divergent or convergent, as in FIGS. 19a and 19c. Note that unfaceted central section 770 refracts rays, as shown. The arc light source at 764 may be produced by anode and cathode elements 764a and 764b. Top exit surface 759 is circularly curved in the section shown; but the lens may have external, stairstep faceting. Protective transparent envelope 769 keeps outside air away from the arc.

Figure 23:
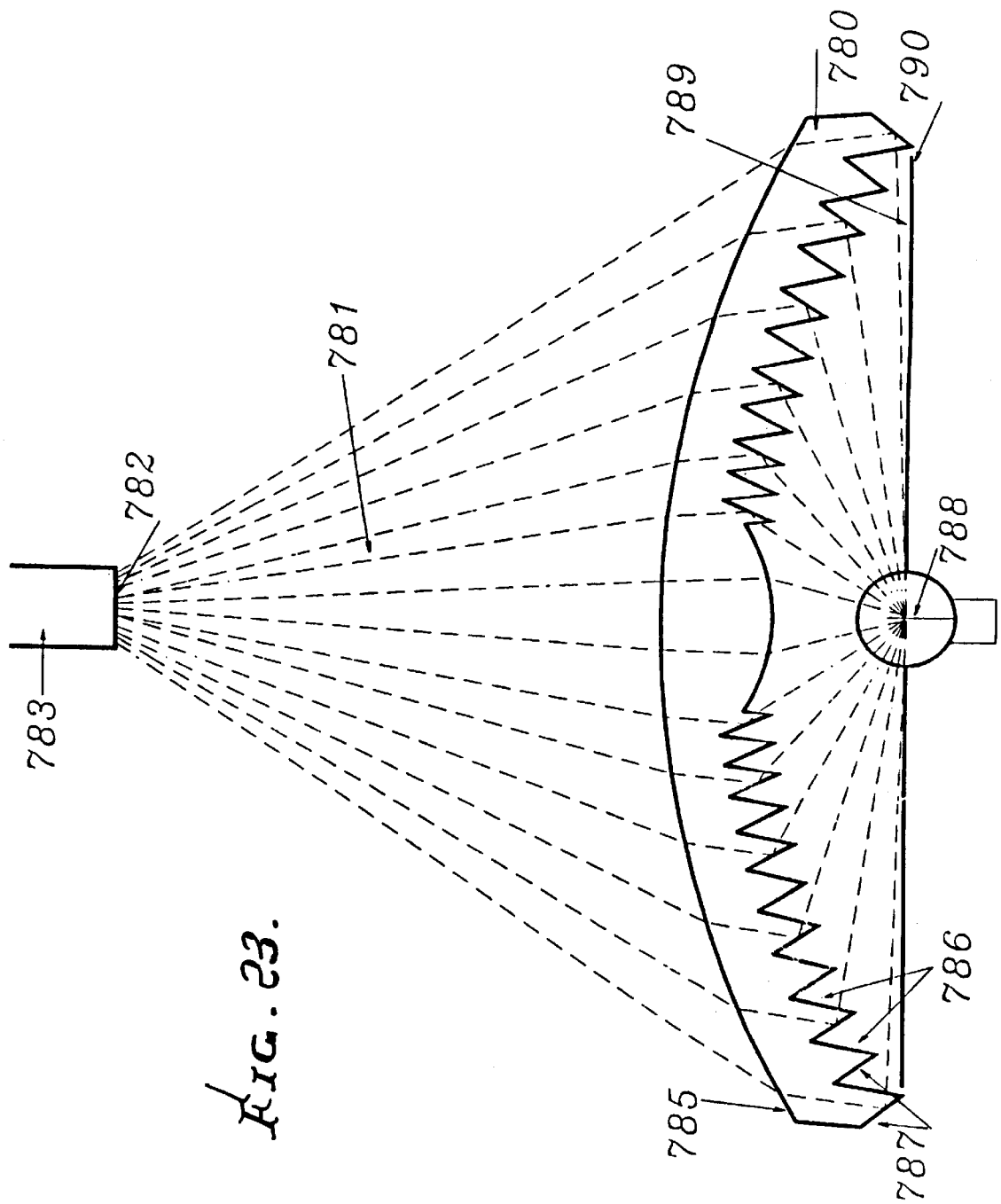
FIG. 23 is a section showing a radiant energy transmitting body means, as in FIG. 21a, directing converging light toward a light pipe.

In FIG. 23, the body means 780 may have the same or similar construction as that of FIG. 19a, for producing and directing convergent light at 781 into the entrance end 782 of a light pipe 783. The lens has an upwardly convex arcuate upper exit surface or face 785, an entrance face or faces 786, and a TIR face or faces 787. Faces 786 and 787 taper downwardly toward plane 790, corresponding to plane 710 in FIG. 21. A central light source 788 is positioned in the manner of the LED in FIG. 21. A planar back mirror 789 extends in plane 790 corresponding to plane 710 and faces upwardly. This device may input up to 80% of the light into pipe 783, rather than 10% of the light as via a conventional ellipsoidal reflector.

Figure 24:
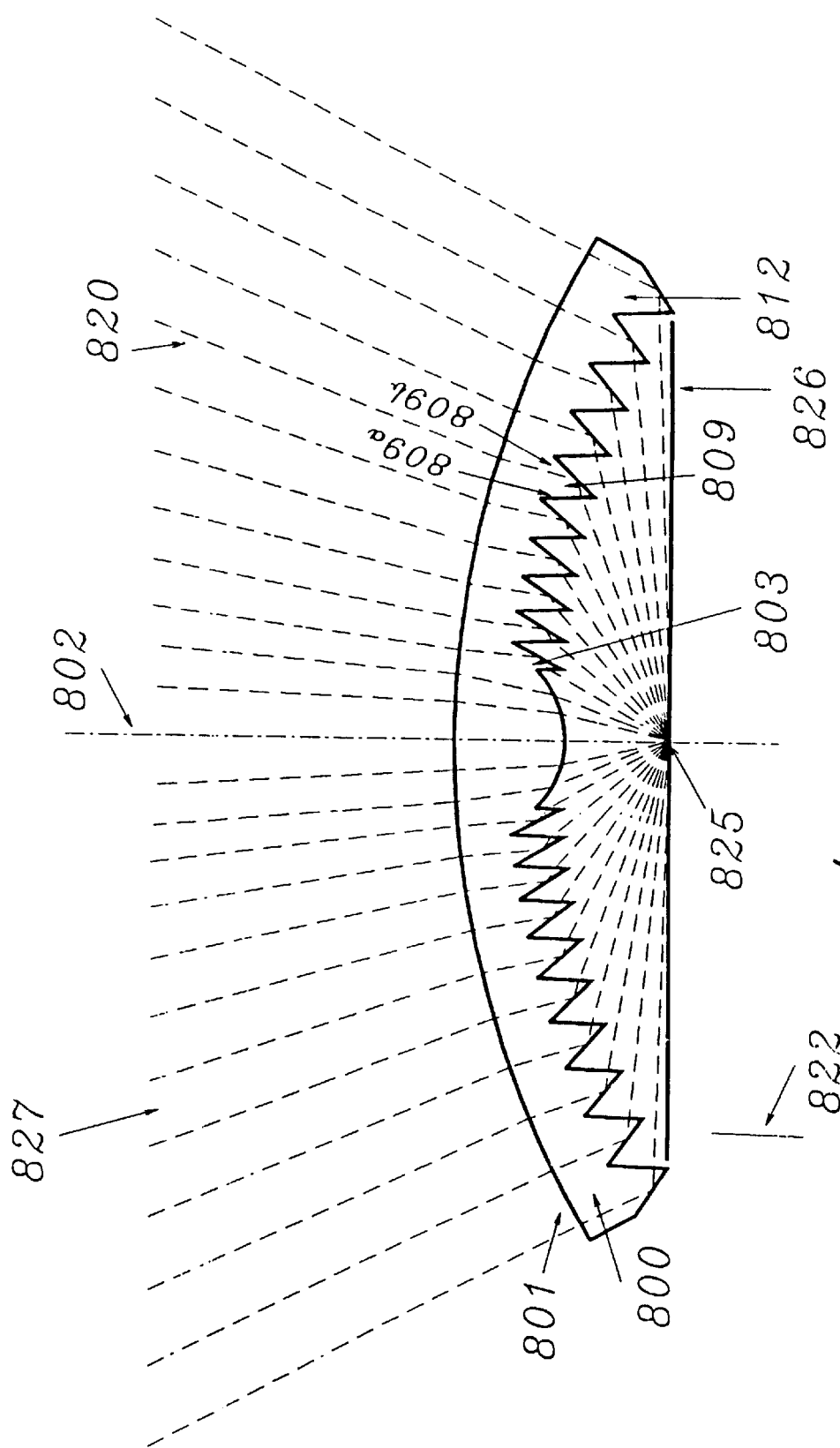
FIG. 24 is a section showing a radiant energy transmitting means, directing diverging light as in a floodlight.

In FIG. 24, the body means 800 may have the same or similar construction as that of FIG. 21c. Circularly curved top surface 801 is curved downwardly. The lens axis, in the case of an annular set of facets, is indicated at 802. Facets are seen from 803 to 812. A typical annular facet 809 has an entrance face 809a and a TIR face 809b. Note ray 820 path passing through face 809a and face 801, and totally reflected at face 809b. In the section shown, each of the faces 809a and 809b is flat. All entry faces have draft in the direction 822, for ease of molding. The lens is transparent and may consist of molded plastic material.

A light source 825 is located on axis 802, and just above the plane 826, is within the confines of the hollow lens, as in the above examples; and the rays 827 emanating from face 802 diverge, as in a floodlight application. The circular section half-angle subtended by the surface 801 is typically less than 45° and greater than 25°, and is typically about 35°.

Figure 25:
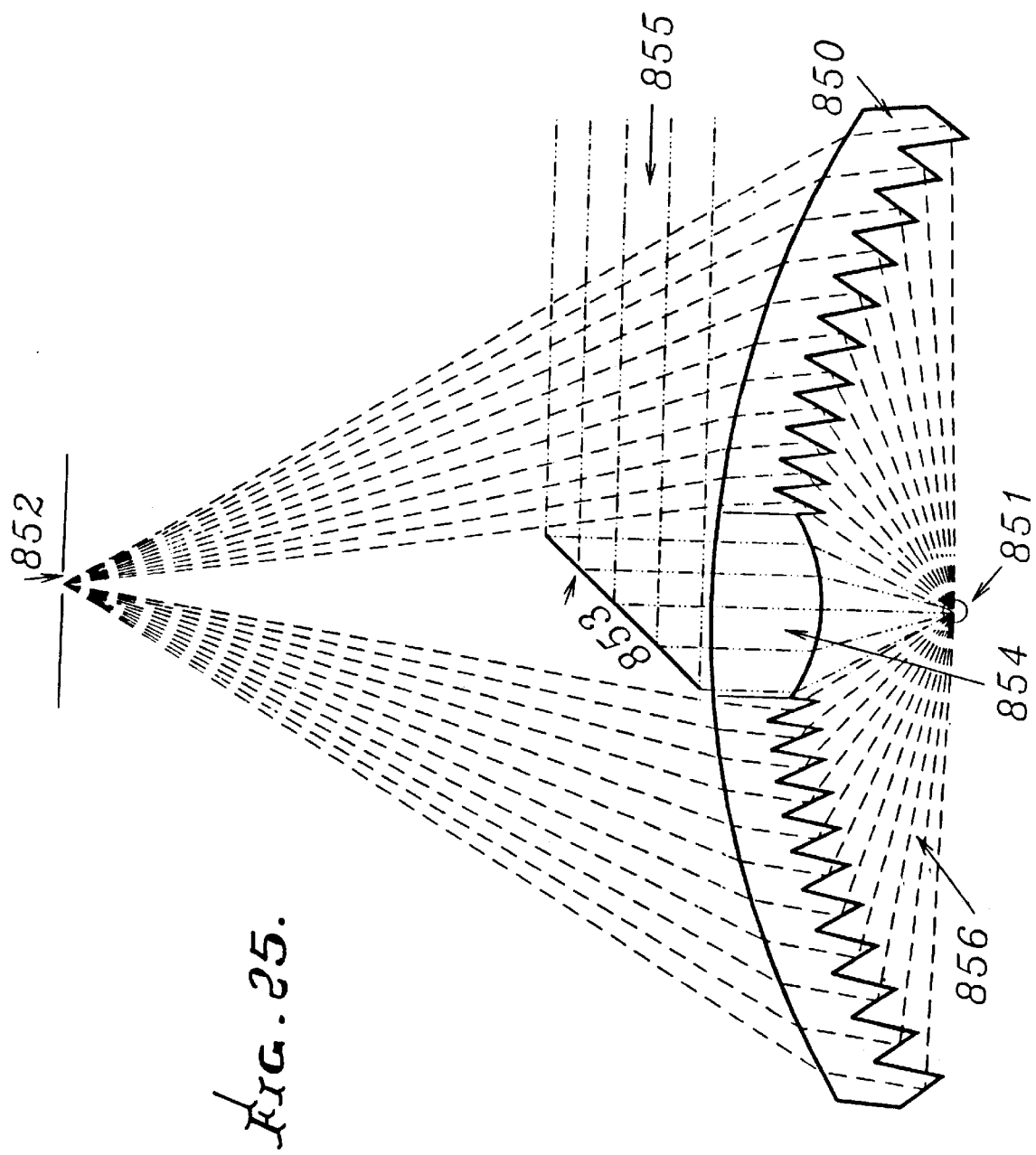
FIG. 25 is a section showing a radiant energy transmitting means, directing light from a layer-stimulated sample to converge into a spectroscopic analyzer.

In FIG. 25, lens body 850 is the same as that of FIG. 21a, except that the central refractive means has been replaced by microscope objective 854, which can slide axially inside the lens to focus on sample 851. Characteristic diffuse (i.e., in all directions) emission 856 from sample 851 is collected by lens 850 and focused on analyzer entrance slit 852. Collimated laser beam 855 is reflected by mirror 853 into objective 854 and focused on sample 851. Mirror 853 is removable in order to use microscope objective 854 to view sample 851 and exactly adjust its position. Lens body 850 could extend downward below sample 851 to collect even more of the diffuse emission. Sample 851 may be a glass capillary containing a gas or liquid, a gold hemisphere coated with a sample substance, an integrated circuit on a production line (checking material composition or contamination), or a biological tissue sample.

Figure 26:
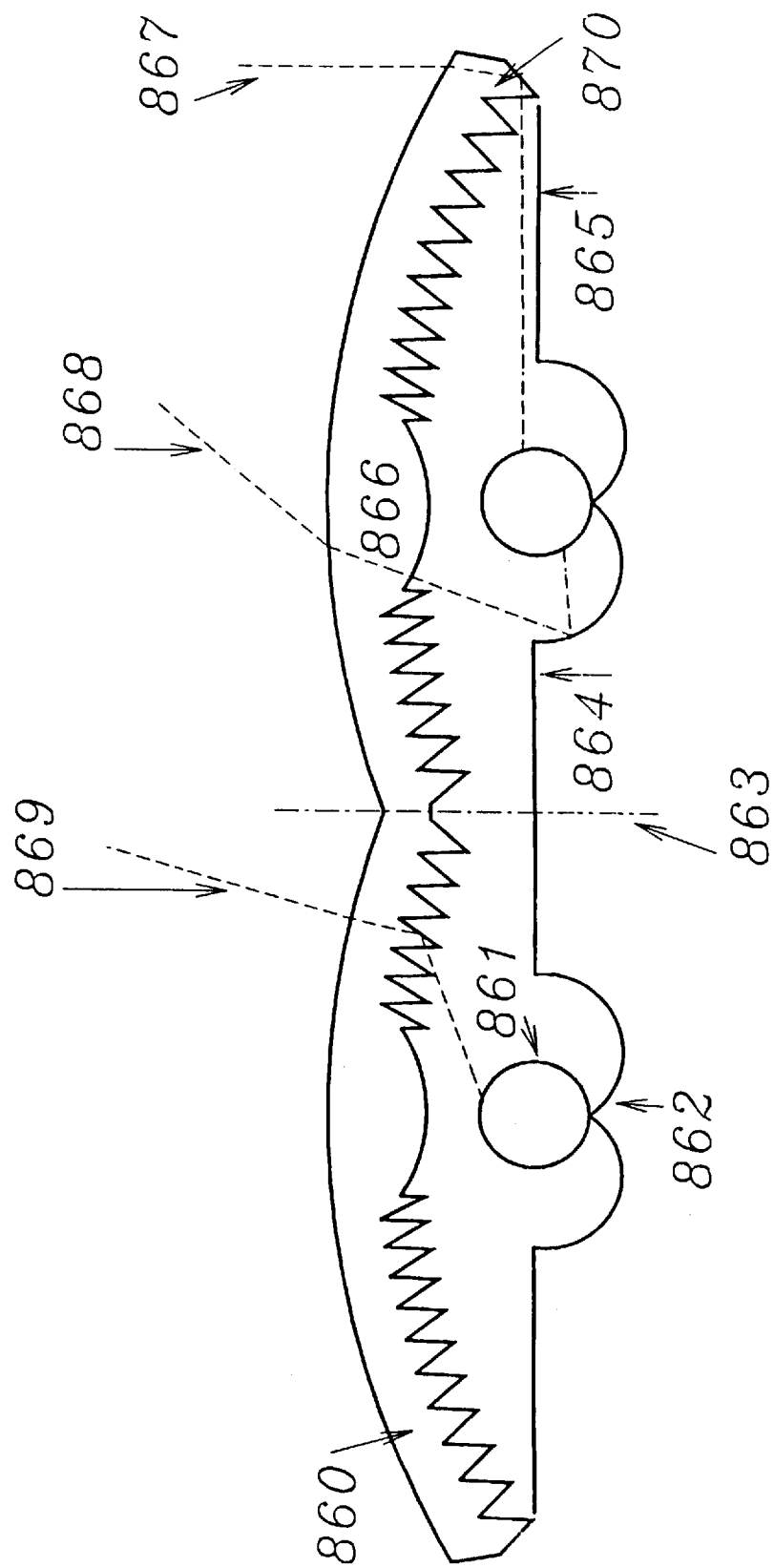
FIG. 26 is a section showing a radiant energy transmitting means, directing light from a toroidal source.

In FIG. 26, lens body 860 has a cross-section with axis 863, in order to accommodate toroidal (typically fluorescent) light source 861. Beneath this lamp is annular involute reflector 862, with disc-shaped, planar mirror section 864 inside it and annulus mirror 865 outside it. Annular lens 866 refracts ray 868, which was reflected from involute 862. Ray 869 is exactly analogous to ray 820 in FIG. 24. Ray 867 is redirected by facet 870. The overall device of lamp, lens, and reflector comprise a compact floodlamp that offers much narrower divergence and much higher efficiency than possible with the prior art of reflector design.

Figure 27:
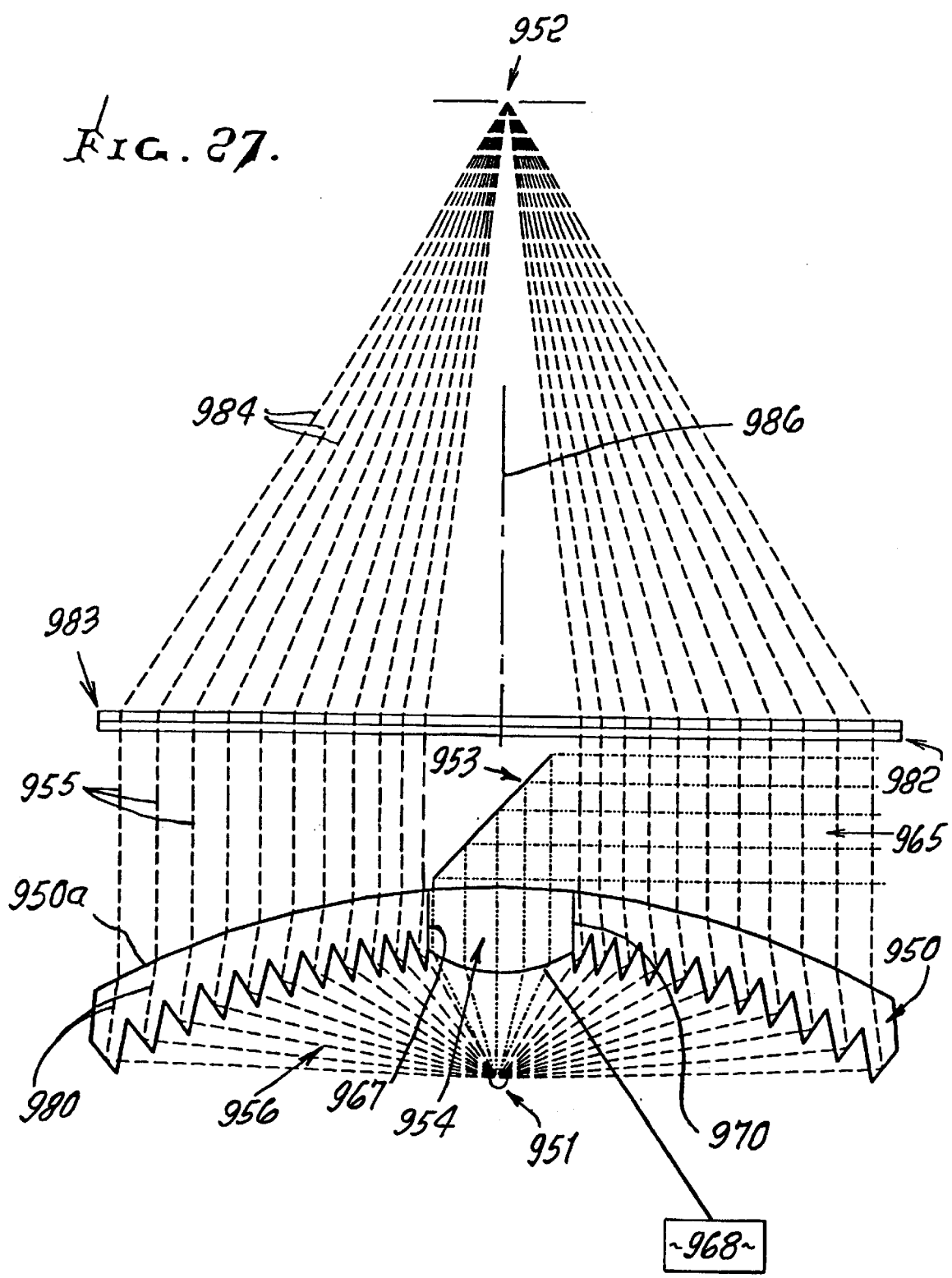
FIG. 27 is a section like FIG. 25 but showing provision of a second lens, and a filter, in the path of collimated light or radiation.

Referring now to FIG. 27, the lens body 950 is the same as shown in FIG. 19b or as in FIG. 25, modified to collimate light or a laser beam, supplied as indicated at 955. A light source or light-emitting target (laser for example) 951 transmits light to faceted side of the TIR lens body 950, the latter redirecting the light rays, as shown by the broken lines 956 and 980, to pass through first refracting lens means at surface 950a and emerge as collimated light at 955. Such light then impinges on and passes through the wavelength selective filter 982 and then through a second lens means 983 indicated in the example as a focusing Fresnel lens. The latter redirects or focuses light at 984 onto the sample, or an analyser, 952.

A wavelength-selective filter 982 is used to remove passively scattered light of the collimated laser beam 955, while allowing passage of fluorescence wavelengths, such as those generated in Raman spectroscopy, for stimulated emissions at 952. The filter 982 extends in a plane normal to principal axis 986 defined by the lens 950 and by lens 983, the filter requiring normal incidence of light for good wavelength selection, since the filter wavelength depends upon the angle of incidence. The filter typically removes the laser wavelengths. The auxiliary or second lens means 983 can also act to reduce any aberrations introduced by the annular TIR lens 950.

Also shown, as in FIG. 27, is a microscope objective lens 954 which can slide axially in a bore in lens 950, and focus auxiliary source light 965 onto the target or laser 951. Note the cylindrical periphery 970 of 954 parallel to axis 986, and sliding in bore 967 of lens 950. A means to adjustably move objective lens 954 axially is schematically shown at 968. Auxiliary source light 965 may be redirected by mirror 953, as shown, toward lens 954, for focusing onto the target 951.

In FIG. 28, a linear TIR lens 1027 is elongated in direction 1028, as are the lens facets 1027a. An elongated light source is indicated at 1029, along the focal line 1029a. A planar mirror 1030 extends across the faceted side of the lens, and reflects backlight from the source toward the facets.

The exit side or face of the lens is coupled to a waveguide 1025, as better shown in FIG. 29; and light is injected in direction 1026 edgewise into the waveguide. The lens may be integral with the waveguide, or attached to its edge, as indicated by plane 1040 in FIG. 29.

FIG. 29 also incorporates known optical means, indicated here by a reflector 1025a, to redirect light 90° in the planar waveguide, as shown by arrows 1070. A liquid crystal display is shown at 1042 at the upper side of the flat, planar waveguide, and may be used for the screen of a portable computer.

The TIR lens facets fulfill two functions:
1) light from the source is efficiently collected and injected into the waveguide, within the angular range appropriate for guided propagation within the waveguide;
2) light from the source is transversely spread, producing spatial uniformity of illumination across the upper face of the waveguide.

The central Fresnel facets of the linear lens are in this case are replaced by a concave cylinder seen at 1027c, for those rays of the source that can directly pass into the waveguide.

FIG. 30 shows in perspective the elongated TIR lens extending along the sides of the planar waveguide. See lens elongated sections 1027 and 1027', oriented at 90° to one another. The waveguide may consist of plastic, such as acrylic, as shown at 1027d. Light from the lens sections travels in the waveguide in directions indicated by arrows 1038 and 1039.

In addition to use with small fluorescent lamps and small incandescent lamps, this configuration is especially suitable for use with light-emitting diodes (LEDs), which are very small and can be placed on the focal line of the linear lens. In this way, the light of red, green, and blue LEDs will be mixed to a uniform white. Alternatively, the three groups of LEDs may be separately triggered, so that only those of one color are emitting light at any one time, for sequential-color liquid crystal displays, which have three times the spatial resolution of conventional color displays.

FIG. 30 shows, by way of example, red, green, and blue LEDS, in repeated groups, and identified as follows:

| LED | emitted light color |
| --- | --- |
| 1052 | red |
| 1053 | green |
| 1054 | blue |

The spacing of the LEDs along 1027 and 1027', and their groups, is greatly exaggerated. A control 1055 is connected to the LEDs via the illustrated leads, to control ON-OFF states, whereby color control at the upper side of the waveguide panel is achieved.

FIG. 31 illustrates a rectangular and planar waveguide 1063, similar to waveguide 1025. It is illuminated along two of its edges 1063a and 1063b, which extend at 90° relative to one another. The illumination sources are circular TIR lenses 1060, as described above, but made integral with the waveguide edges, as by embossing. Each lens has its own light source, indicated at 1064. The annular facets of the lenses face outwardly, i.e., away from the waveguide, but are not illustrated in this view. (See, however, circular TIR lens and their facets, discussed and shown above.)

FIGS. 32–34 show a waveguide 1069 that tapers endwise, away from the TIR lens 1071, coupled to the waveguide. Note circular cross section wall 1072 of the waveguide that tapers endwise, in the form of a tapering rod. The latter is coupled at its narrowest end 1069a in FIG. 34 to an optical fiber 1069b that conducts light endwise in direction 1076. A light source 1080 emits light toward the faceted side of the TIR lens 1071.

Tapered rod 1069 serves to conduct and to spread light out into the full angular range $\Theta_f$ carried by the plastic fiber 1069b. This range is typically 30°. The amount of taper depends upon the angular range $\Theta_L$ of the light leaving the facets (typically up to 10°), which is in turn determined by the ratio of lens diameter to source size. The lens diameter $d_L$ and fiber diameter $d_f$ are related by $$d_L \sin \Theta_L = d_F \sin \Theta_F$$

Depending upon its type, light may propagate along a fiber's length to its opposite end, or it may be emitted out the sides of the fiber, for illumination purposes. In the first case, a transparent casing 1091 is placed around the fiber to confine the propagating light. Known as "cladding", its refractive index $n_c$ is lower than the refractive index $n_f$ of the fiber. These indices determine the fiber's angular range according to its numerical aperture (N.A.):

$$N.A. = \sin \Theta_F = \sqrt{(n_f^2 - n_c^2)}$$

For example, a polycarbonate fiber, with $n_f=1.59$, and an acrylic cladding, with $n_c=1.495$, have an N.A.=0.54 and $\Theta_F=32.8°$.

In general, this form of the invention provides efficient coupling of an LED's radiation into a multi-mode optical fiber, for a variety of purposes, both in illumination, as shown here, and communication, where LEDs are already in wide use. Besides LEDs, this configuration can be used for any light source, such as small incandescent lamps, that is much smaller than a fiber's diameter.

FIG. 33 shows the TIR lens 1071 in greater detail. Numeral 1081 indicated a reflector in FIG. 32.

We claim:
1. In combination,
   a) a TIR lens having multiple facets, and
   b) a waveguide optically coupled to the TIR lens,
   c) said waveguide having an edge portion,
   d) said TIR lens including multiple TIR lenses located proximate said edge portion,
   e) and including multiple light sources, each source associated with and facing one of said TIR lenses,
   f) and wherein there are multiple like groups of three of said sources.
2. The combination of claim 1 wherein the waveguide has a longitudinally endwise elongated body, and the TIR lens is located to direct light into waveguide to travel longitudinally therein.
3. The combination of claim 2 wherein the waveguide body tapers endwise.
4. The combination of claim 2 wherein the TIR lens has facets facing away from the waveguide, and including a light source directing light toward said facets.

5. The combination of claim 4 wherein a continuation of the waveguide comprises an optical fiber.

6. The combination of claim 4 wherein the waveguide is an optical fiber or fibers.

7. The combination of claim 1 wherein the waveguide is an optical fiber or fibers.

8. The combination of claim 1 wherein the light sources are LEDs.

9. The combination of claim 8 wherein each TIR lens has multiple facets facing an LED, the facets receiving light from the LED for propagation into the waveguide.

10. The combination of claim 1 wherein the waveguide is a plate having at least one edge, and said TIR lens extending proximate said edge.

11. The combination of claim 10 wherein said edge is elongated, and said TIR lens is also elongated in the direction of edge elongation.

12. The combination of claim 10 wherein said edge is elongated, and said multiple TIR lens distributed along said plate edge.

13. The combination of claim 10 including a liquid crystal display located in light-receiving relation relative to the waveguide.

14. The combination of claim 11 wherein said TIR lens is an elongated linear TIR lens, said waveguide being a planar waveguide.

15. The combination of claim 11 wherein the elongated TIR lens defines a focal line, and including LEDs spaced apart along said focal line to emit light transmitted via the TIR lens into the waveguide.

16. The combination of claim 14 including a liquid crystal display located in light-receiving relation relative to the waveguide.

17. The combination of claim 1 wherein said TIR lenses are circular.

18. The combination of claim 1 including means to cause the sources to emit light of different colors.

19. The combination of claim 1 wherein the TIR lenses and waveguide are integral.

20. In combination,
   a) a TIR lens having multiple facets, and
   b) a waveguide optically coupled to the TIR lens,
   c) the waveguide being a plate having at least one edge, the TIR lens extending proximate said edge,
   d) said edge being elongated and said TIR lens comprises multiple TIR lens distributed along said plate edge,
   e) and including multiple light sources, each source associated with and facing one of said TIR lenses, and means to cause the sources to emit light of different colors,
   f) and wherein there are multiple like groups of three of said sources, one source in each group emitting light of a first color, a second source in each group emitting light of a second color, and a third source in each group emitting light of a third color.

* * * * *